US010282606B2

(12) United States Patent
Guo et al.

(10) Patent No.: US 10,282,606 B2
(45) Date of Patent: *May 7, 2019

(54) ORGANIZATIONAL LOGO ENRICHMENT

(71) Applicant: Microsoft Technology Licensing, LLC, Redmond, WA (US)

(72) Inventors: Songtao Guo, Cupertino, CA (US); Christopher Matthew Degiere, Palo Alto, CA (US); Jingjing Huang, Santa Clara, CA (US); Aarti Kumar, San Carlos, CA (US); Alex Ching Lai, Menlo Park, CA (US); Xian Li, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/937,051

(22) Filed: Mar. 27, 2018

(65) Prior Publication Data

US 2018/0218207 A1 Aug. 2, 2018

Related U.S. Application Data

(63) Continuation of application No. 14/929,116, filed on Oct. 30, 2015, now Pat. No. 10,002,292.

(Continued)

(51) Int. Cl.
*G06K 9/00* (2006.01)
*H04L 29/08* (2006.01)
(Continued)

(52) U.S. Cl.
CPC ... *G06K 9/00456* (2013.01); *G06F 17/30256* (2013.01); *G06F 17/30259* (2013.01);
(Continued)

(58) Field of Classification Search
CPC .......... G06K 9/00456; G06K 9/00469; G06K 9/6263; G06K 9/6256; G06K 9/6215;
(Continued)

(56) References Cited

U.S. PATENT DOCUMENTS 7,054,886 B2   5/2006   Stern et al.
8,032,546 B2   10/2011  Arasu et al.
(Continued)

OTHER PUBLICATIONS

"U.S. Appl. No. 14/929,104, Examiner Interview Summary dated Mar. 8, 2018", 3 pgs.
(Continued)

*Primary Examiner* — Vincent Rudolph
*Assistant Examiner* — Pinalben Patel
(74) *Attorney, Agent, or Firm* — Schwegman Lundberg & Woessner, P.A.

(57) ABSTRACT

In an example embodiment, a web page is obtained using a web page address stored in a first record and is parsed to extract one or more images from the web page along with a first plurality of features for each of the one or more images from the web page. Information about each image of the web page and the extracted first plurality of features for the web page are input into a supervised machine learning classifier to calculate a logo confidence score for each image of the web page, the logo confidence score indicating the probability that the image is an organization logo. In response to a particular image in the web page having a logo confidence score transgressing a first threshold, the particular image is injected into an organization logo field of the first record.

20 Claims, 29 Drawing Sheets

Related U.S. Application Data

(60) Provisional application No. 62/235,451, filed on Sep. 30, 2015.

(51) Int. Cl.

| | | |
|---|---|---|
| *G06F 17/30* | (2006.01) | |
| *G06Q 50/00* | (2012.01) | |
| *G06Q 10/10* | (2012.01) | |
| *G06Q 10/06* | (2012.01) | |
| *G06N 99/00* | (2010.01) | |
| *G06N 7/02* | (2006.01) | |
| *G06K 9/62* | (2006.01) | |
| *G06K 9/46* | (2006.01) | |

(52) U.S. Cl.
CPC .. *G06F 17/30265* (2013.01); *G06F 17/30448* (2013.01); *G06F 17/30466* (2013.01); *G06F 17/30598* (2013.01); *G06F 17/30864* (2013.01); *G06F 17/30958* (2013.01); *G06K 9/00469* (2013.01); *G06K 9/46* (2013.01); *G06K 9/6215* (2013.01); *G06K 9/6256* (2013.01); *G06K 9/6263* (2013.01); *G06K 9/6276* (2013.01); *G06N 7/02* (2013.01); *G06N 99/005* (2013.01); *G06Q 10/06393* (2013.01); *G06Q 10/10* (2013.01); *G06Q 50/01* (2013.01); *H04L 67/10* (2013.01); *H04L 67/306* (2013.01); *G06K 2209/25* (2013.01); *Y04S 10/54* (2013.01)

(58) Field of Classification Search
CPC ............ G06K 9/6276; G06F 17/30256; G06F 17/30259; G06F 17/30265; G06F 17/30466; G06F 17/30598; G06F 17/30958; G06F 17/30448; G06F 17/30864; G06Q 10/10; G06Q 10/06393; G06Q 50/01; G06N 99/005; G06N 7/02; H04L 67/10; H04L 67/306
See application file for complete search history.

(56) References Cited

U.S. PATENT DOCUMENTS

| | | |
|---|---|---|
| 8,121,970 B1 | 2/2012 | Tung et al. |
| 8,438,163 B1* | 5/2013 | Li .................. G06F 17/3028 |
| | | 382/159 |
| 8,995,771 B2 | 3/2015 | Zhang et al. |
| 9,483,740 B1 | 11/2016 | Ansel et al. |
| 9,613,190 B2 | 4/2017 | Ford et al. |
| 9,723,174 B2 | 8/2017 | Inomata |
| 10,002,292 B2 | 6/2018 | Guo |
| 2003/0097814 A1 | 5/2003 | Furukawa |
| 2004/0249789 A1 | 12/2004 | Kapoor et al. |
| 2008/0288482 A1 | 11/2008 | Chaudhuri et al. |
| 2009/0234826 A1 | 9/2009 | Bidlack |
| 2010/0150448 A1 | 6/2010 | Lecerf et al. |
| 2010/0274804 A1 | 10/2010 | Muskal et al. |
| 2011/0131485 A1 | 6/2011 | Bao et al. |
| 2012/0150888 A1 | 6/2012 | Hyatt et al. |
| 2012/0232955 A1 | 9/2012 | Riazzi et al. |
| 2013/0103555 A1 | 4/2013 | Carter |
| 2014/0033307 A1 | 1/2014 | Schmidtler |
| 2014/0067756 A1 | 3/2014 | Stelman et al. |
| 2014/0143323 A1 | 5/2014 | Posse et al. |
| 2014/0359760 A1 | 12/2014 | Gupta et al. |
| 2015/0058950 A1 | 2/2015 | Miu |
| 2015/0066934 A1* | 3/2015 | Duan ............... G06F 17/30873 |
| | | 707/737 |
| 2015/0339572 A1 | 11/2015 | Achin et al. |
| 2016/0092557 A1 | 3/2016 | Stojanovic et al. |
| 2016/0125361 A1 | 5/2016 | Vivas et al. |
| 2016/0132832 A1 | 5/2016 | Pinkovezky et al. |
| 2016/0275533 A1 | 9/2016 | Smith et al. |
| 2016/0314408 A1 | 10/2016 | Gulwani et al. |
| 2016/0350875 A1 | 12/2016 | Deb et al. |
| 2016/0364373 A1 | 12/2016 | Cai |
| 2017/0034211 A1 | 2/2017 | Buergi et al. |
| 2017/0091270 A1 | 3/2017 | Guo et al. |
| 2017/0091274 A1 | 3/2017 | Guo et al. |
| 2017/0091543 A1 | 3/2017 | Guo et al. |
| 2017/0091692 A1 | 3/2017 | Guo et al. |

OTHER PUBLICATIONS

"U.S. Appl. No. 14/929,104, Non Final Office Action dated Jan. 23, 2018", 35 pgs.

"U.S. Appl. No. 14/929,104, Response filed Mar. 8, 2017 to Non Final Office Action dated Jan. 23, 2018", 10 pgs.

"U.S. Appl. No. 14/929,109, Examiner Interview Summary dated Feb. 1, 2018", 3 pgs.

"U.S. Appl. No. 14/929,109, Non Final Office Action dated Dec. 14, 2017", 39 pgs.

"U.S. Appl. No. 14/929,109, Response filed Feb. 23, 2018 to Non Final Office Action dated Dec. 14, 2017", 22 pgs.

"U.S. Appl. No. 14/929,116, Examiner Interview Summary dated Jun. 14, 2017", 4 pgs.

"U.S. Appl. No. 14/929,116, Non Final Office Action dated Apr. 10, 2017", 32 pgs.

"U.S. Appl. No. 14/929,116, Notice of Allowance dated Feb. 21, 2018", 9 pgs.

"U.S. Appl. No. 14/929,116, Notice of Allowance dated Nov. 13, 2017", 14 pgs.

"U.S. Appl. No. 14/929,116, Response filed Jul. 28, 2017 to Non Final Office Action dated Apr. 10, 2017", 11 pgs.

"U.S. Appl. No. 14/929,104, Final Office Action dated Jul. 19, 2018", 41 pgs.

"U.S. Appl. No. 14/929,109, Final Office Action dated Jul. 5, 2018", 43 pgs.

"U.S. Appl. No. 14/929,128, Non Final Office Action dated May 9, 2018", 13 pgs.

"U.S. Appl. No. 14/929,128, Response filed Aug. 7, 2018 to Non Final Office Action dated May 9, 2018", 10 pgs.

"Notice of Allowance Issued in U.S. Appl. No. 14/929,104", dated Nov. 16, 2018, 10 Pages.

"Non Final Office Action Issued in U.S. Appl. No. 14/929,109", dated Nov. 16, 2018, 39 Pages.

Fung, et al., "Hierarchical Document Clustering Using Frequent Itemsets", In Proceedings of the 2003 SIAM International Conference on Data Mining, May 1, 2003, pp. 59-70.

"Final Office Action Issued in U.S. Appl. No. 14/929,128", dated Dec. 13, 2018, 15 Pages.

\* cited by examiner

| image | pred_prob |
|---|---|
| http://example.com/images/header.jpg | 94% |
| http://example.com/images/header_pages3.jpg | 7% |
| http://example.com/images/pages_thestudio.jpg | 0% |
| http://example.com/images/nbanner_hd.jpg | 0% |
| http://example.com/images/nbanner_demos.jpg | 0% |
| http://example.com/images/nbanner_music.jpg | 0% |
| http://example.com/images/nbanner_laprod.jpg | 0% |
| http://example.com/images/nbanner_drive2tape.jpg | 0% |
| http://example.com/images/pages_mainRIGHT2.jpg | 0% |

1200 — image ; 1202 — pred_prob

| tag | f_dim_area | f_dim_heig | f_dim_w_k | f_dim_widt |
|---|---|---|---|---|
| <img src*/images/header | 159100 | 215 | 1 | 740 |
| <img src*images/header_p | 14800 | 20 | 1 | 740 |
| <img src*images/pages_th | 22400 | 56 | 1 | 400 |
| <img src*images/nbanner_ | -1 | -1 | 0 | -1 |
| <img src*images/nbanner_ | -1 | -1 | 0 | -1 |
| <img src*images/nbanner_ | -1 | -1 | 0 | -1 |
| <img src*images/nbanner_ | -1 | -1 | 0 | -1 |
| <img src*images/nbanner_ | -1 | -1 | 0 | -1 |
| <img src*images/pages_ma | 10880 | 32 | 1 | 340 |

1204, 1206, 1208, 1210, 1212

| f_href_root | f_nmatch_i | f_nsiml_alt | f_nsiml_im | f_top_prox |
|---|---|---|---|---|
| 1 | 0 | 0 | 0.5 | 1 |
| 0 | 0 | 0 | 0.38 | 0.923077 |
| 0 | 0 | 0 | 0.4 | 0.846154 |
| 0 | 0 | 0.42 | 0.3 | 0.769231 |
| 0 | 0.666667 | 0.8 | 0.3 | 0.692308 |
| 0 | 0.666667 | 0.71 | 0.38 | 0.615385 |
| 0 | 0 | 0.42 | 0.35 | 0.538452 |
| 0 | 0 | 0.23 | 0.27 | 0.461538 |
| 0 | 0 | 0 | 0.31 | 0.384615 |

CORE PROBLEM 1: RECORD LINKAGE

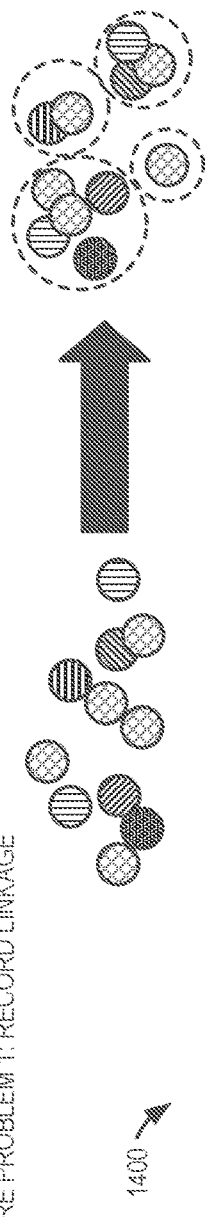

| | SRC | NAME | PHONE | ADDRESS | CITY | URL | INDUSTRY |
|---|---|---|---|---|---|---|---|
| 1402 | BBG | INTERNATIONAL BUS... MACHINES CORP | 1-914-499-1990 | | | WWW.IBM.COM | COMPUTER SERVIC... |
| 1404 | HOV | INTERNATIONAL BUS... MACHINES CORP | 914-499-1900 | 1 NEW OR... RD. | ARMONK | | |
| 1406 | SFDC | INTERNATIONAL BUS... MACHINES CORP (IBM) | (919)543-6919 | 1 NEW OR... RD. | ARMONK | WWW.IBM.COM | INFORMATION TECH... AND SERVICES |
| 1408 | CRB | IBM | 914-499-1900 | NEW OR... ROAD | ARMONK | WWW.IBM.COM | SOFTWARE |
| 1410 | U | IBM | 0108444274 | NEW OR... ROAD | ARMONK | WWW.IBM.COM | INFORMATION TECH... AND SERVICES |
| 1412 | U | DISTRIBUTION SERVICES | +58-212-3545412 | | CARACAS | WWW.DI...COM | MARKETING AND ADVERTISING |
| 1414 | U | DISSERVICES.COM | +58-212-3545412 | | CARACAS | WWW.DI...COM | IMPORT AND EXPORT |
| 1416 | U | MYHILLS | 01234 822 722, | GARY... ROAD | CLECKHE... | WWW.MY...COM | FACILITIES SERVICES |
| 1418 | U | HILLSMY | 01234 822 722, | GARY... ROAD | CLECKHE... | WWW.MY...COM | FACILITIES SERVICES |

FIG. 14

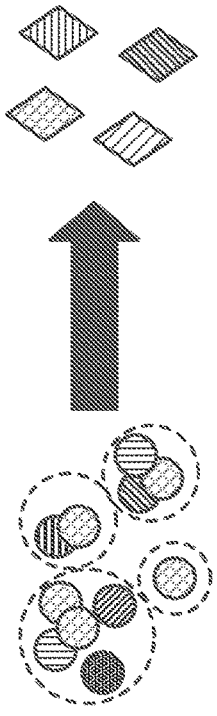

FIG. 15

| SRC | NAME | PHONE | ADDRESS | CITY | URL | INDUSTRY |
|---|---|---|---|---|---|---|
| BBG | INTERNATIONAL BUS... MACHINES CORP | 1-914-499-1990 | | | WWW.IBM.COM | COMPUTER SERVIC... |
| HOV | INTERNATIONAL BUS... MACHINES CORP | 914-499-1990 | 1 NEW OR... RD | ARMONK | | |
| SFDC | INTERNATIONAL BUS... MACHINES CORP (IBM) | (919)543-6919 | 1 NEW OR... RD | ARMONK | WWW.IBM.COM | INFORMATION TECH... AND SERVICES |
| CRB | IBM | 914-499-1900 | NEW OR... ROAD | ARMONK | WWW.IBM.COM | SOFTWARE |
| U | IBM | 0108444274 | NEW OR... ROAD | ARMONK | WWW.IBM.COM | INFORMATION TECH... AND SERVICES |
| U | DISTRIBUTION SERVICES | +58-212-3545412 | | CARACAS | WWW.DI...COM | MARKETING AND ADVERTISING |
| U | DISSERVICES.COM | +58-212-3545412 | | CARACAS | WWW.DI...COM | IMPORT AND EXPORT |
| U | MYHILLS | 01234 822 722, | GARY...ROAD | CLECKHE... | WWW.MY...COM | FACILITIES SERVICES |
| U | HILLSMY | 01234 822 722, | GARY...ROAD | CLECKHE... | WWW.MY...COM | FACILITIES SERVICES |

CORE PROBLEM 2: DATA FUSION

1500

1402 — BBG
1404 — HOV
1406 — SFDC
1408 — CRB
1410 — U

ORGANIZATIONAL LOGO ENRICHMENT

CROSS-REFERENCE TO RELATED APPLICATION

This application is a Continuation of prior application Ser. No. 14/929,116, filed on Oct. 30, 2015, which is a Non-Provisional of and claims the benefit of priority under 35 U.S.C. § 119(e) from U.S. Provisional Application Ser. No. 62/235,451, entitled "ORGANIZATION RECORD ENRICHMENT, CLUSTERING, AND FUSION," filed on Sep. 30, 2015, which are incorporated by reference herein in their entirety.

TECHNICAL FIELD

The present disclosure generally relates to computer technology for solving technical challenges in data collection and management. More specifically, the present disclosure relates to the enrichment of logo data from data sources.

BACKGROUND

The rise of the Internet has given rise to two disparate phenomena: the increase in the presence of social networks, with their corresponding member profiles visible to large numbers of people, and the increase in the presence of databases from which data about entities, such as organizations, can be accessed. It can often be desirable for information about organizations to be used to enhance social networks in a number of ways. For example, it may be desirable for organization profile pages to be created in a social network, even when the organization itself is not involved in the creation. Additionally, organization information can be used to enhance member profiles of individual members who have some relationship to the organization (e.g., employee).

A problem is encountered, however, in that the data sources from which organization information may be obtained are often incomplete or otherwise not completely reliable. When the data sources are incomplete, it creates a technical challenge in determining how to infer or otherwise fill in the missing data. When the data sources are not completely reliable, it creates a technical challenge in determining whether or not to believe the data from a data source.

BRIEF DESCRIPTION OF THE DRAWINGS

Some embodiments of the technology are illustrated, by way of example and not limitation, in the figures of the accompanying drawings.

FIG. 12 is a diagram illustrating an example of features extracted for candidate images in accordance with an example embodiment.

FIG. 14 is a diagram illustrating an example of record linkage in accordance with an example embodiment.

FIG. 15 is a diagram illustrating an example of record fusion in accordance with an example embodiment.

DETAILED DESCRIPTION

Overview

The present disclosure describes, among other things, methods, systems, and computer program products that individually provide functionality for speeding data access. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a platform is provided that acts to enrich organization data from multiple data sources. Member data, data searches, web content mining, and machine learning may be used to infer and retrieve organization attributes automatically. This enriched data acts to increase the quantity and quality of organization data stored in a social network. This document will first describe how a social network operates, and then describe how the enrichment platform fits into a social network environment.

It should be noted that the term "organization" as used throughout this document should be interpreted broadly to cover any type of entity having individuals as members or employees. This would include both for-profit and non-profit organizations, as well as entities that may not be considered organizations under some definitions of the term, such as governmental entities, clubs, associations, etc. Organizations are also to be contrasted with individuals. While it is possible that an organization may be comprised of a single member or employee, the organization would still be a distinct entity from the individual and an organization record would still be distinct from an individual record.

Figure 1:
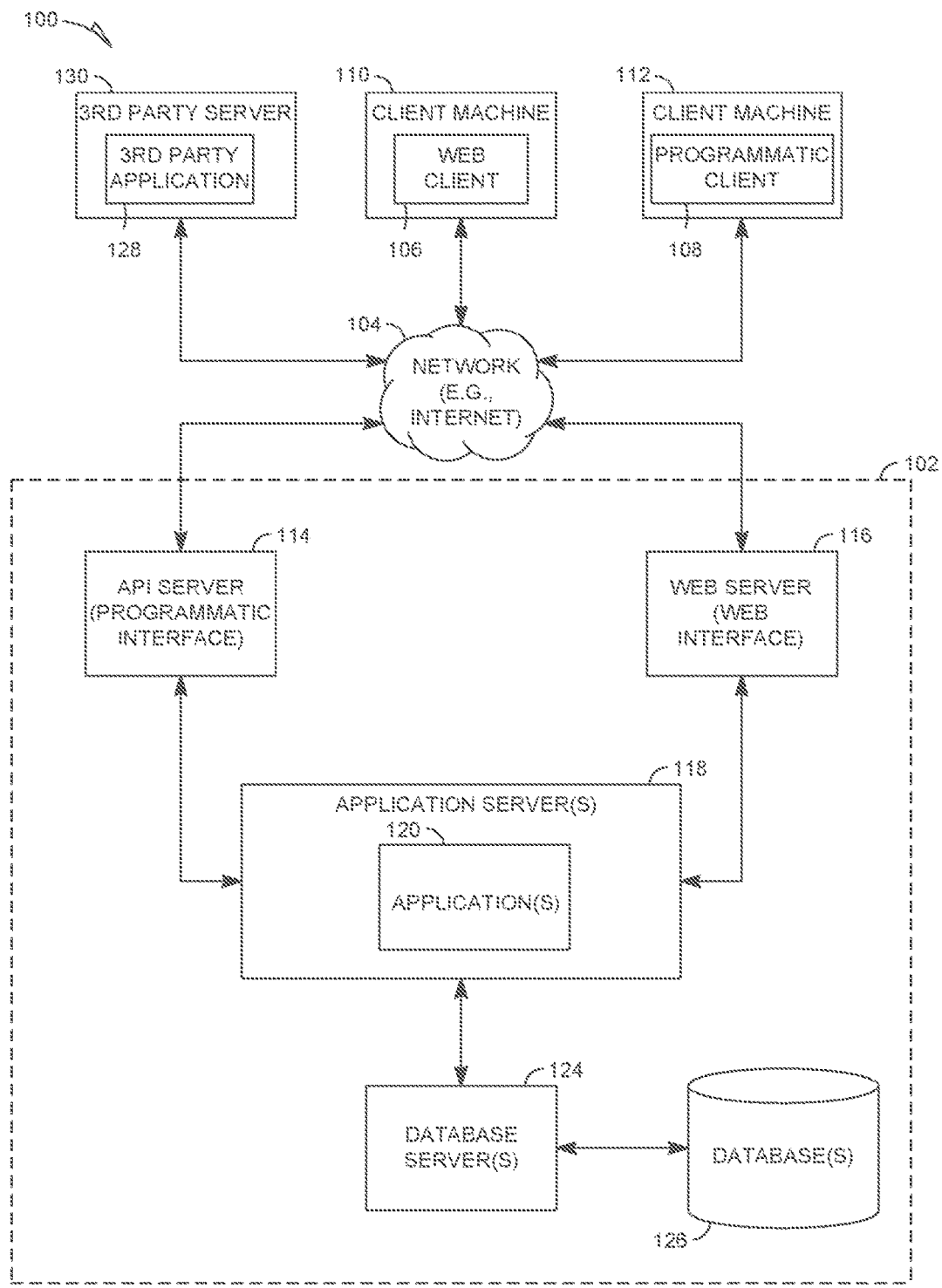
FIG. 1 is a block diagram illustrating a client-server system, in accordance with an example embodiment.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third party application 128, executing on a third party server 130, as having programmatic access to the networked system 102 via the programmatic interface provided by the API server 114. For example, the third party application 128 may, utilizing information retrieved from the networked system 102, support one or more features or functions on a website hosted by a third party. The third party website may, for example, provide one or more functions that are supported by the relevant applications 120 of the networked system 102.

In some embodiments, any website referred to herein may comprise online content that may be rendered on a variety of devices including, but not limited to, a desktop personal computer, a laptop, and a mobile device (e.g., a tablet computer, smartphone, etc.). In this respect, any of these devices may be employed by a user to use the features of the present disclosure. In some embodiments, a user can use a mobile app on a mobile device (any of the machines 110, 112 and the third party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
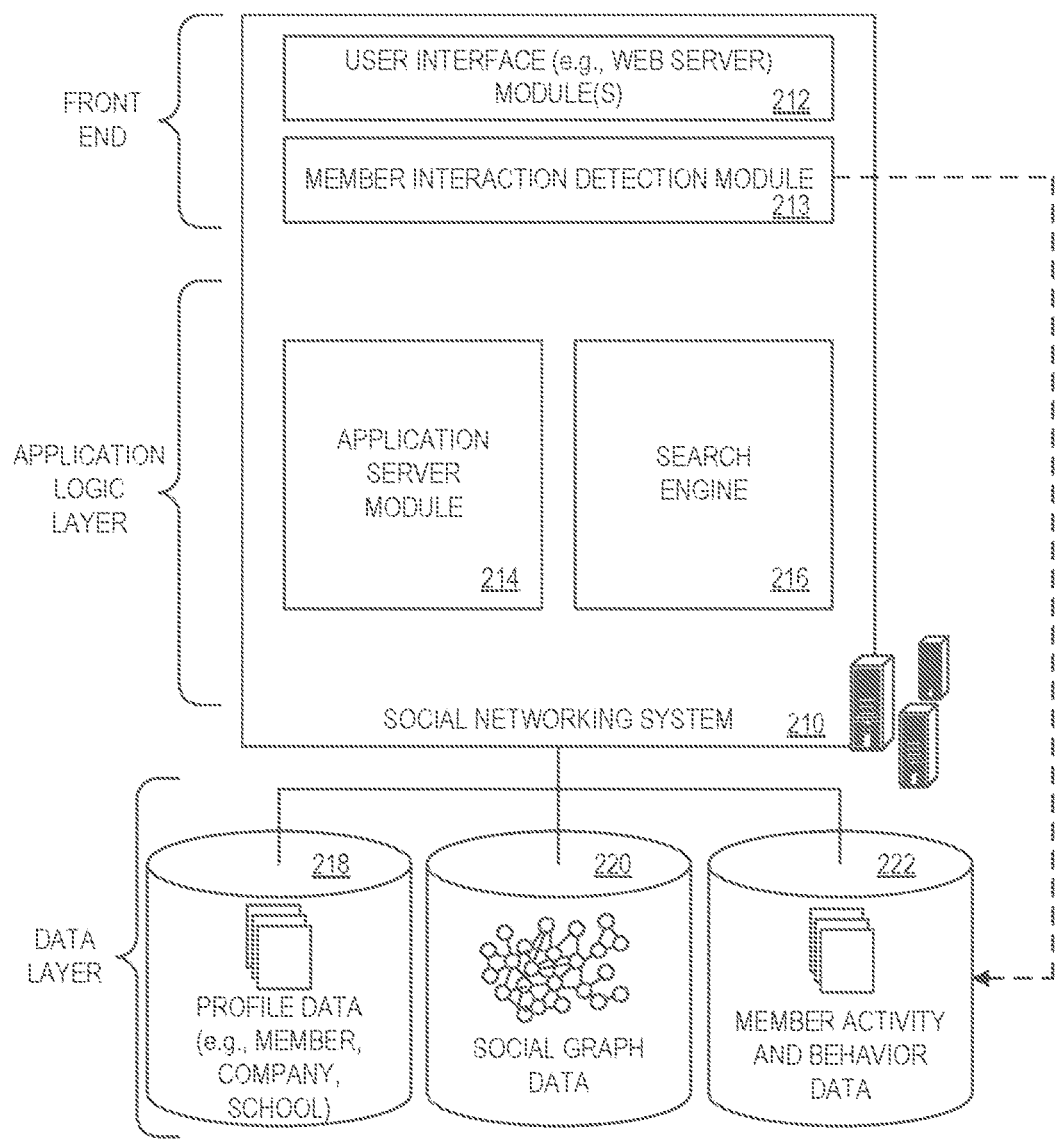
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices, and communicates appropriate responses to the requesting client devices. For example, the user interface module(s) 212 may receive requests in the form of Hypertext Transfer Protocol (HTTP) requests or other web-based API requests. In addition, a member interaction detection module 213 may be provided to detect various interactions that members have with different applications 120, services, and content presented. As shown in FIG. 2, upon detecting a particular interaction, the member interaction detection module 213 logs the interaction, including the type of interaction and any metadata relating to the interaction, in a member activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases, such as a profile database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218, or another database (not shown). In some embodiments, the profile data may be processed (e.g., in the background or offline) to generate various derived profile data. For example, if a member has provided information about various job titles the member has held with the same organization or different organizations, and for how long, this information can be used to infer or derive a member profile attribute indicating the member's overall seniority level, or seniority level within a particular organization. In some embodiments, importing or otherwise accessing data from one or more externally hosted data sources may enrich profile data for both members and organizations. For instance, with organizations in particular, financial data may be imported from one or more external data sources, and made part of an organization's profile. This importation of organization data and enrichment of the data will be described in more detail later in this document.

Once registered, a member may invite other members, or be invited by other members, to connect via the social networking service. A "connection" may constitute a bilateral agreement by the members, such that both members acknowledge the establishment of the connection. Similarly, in some embodiments, a member may elect to "follow" another member. In contrast to establishing a connection, the concept of "following" another member typically is a unilateral operation and, at least in some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph in a social graph database 220.

As members interact with the various applications 120, services, and content made available via the social networking service, the members' interactions and behavior (e.g., content viewed, links or buttons selected, messages responded to, etc.) may be tracked, and information concerning the members' activities and behavior may be logged or stored, for example, as indicated in FIG. 2, by the member activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking service system 210 provides an API module via which applications 120 and services can access various data and services provided or maintained by the social networking service. For example, using an API, an application may be able to request and/or receive one or more navigation recommendations. Such applications 120 may be browser-based applications 120, or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when member profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and member activity and behavior data (stored, e.g., in the member activity and behavior database 222). The search engine 216 may collect, parse, and/or store data in an index or other similar structure to facilitate the identification and retrieval of information in response to received queries for information. This may include, but is not limped to, forward search indexes, inverted indexes, N-gram indexes, and so on.

Figure 3:
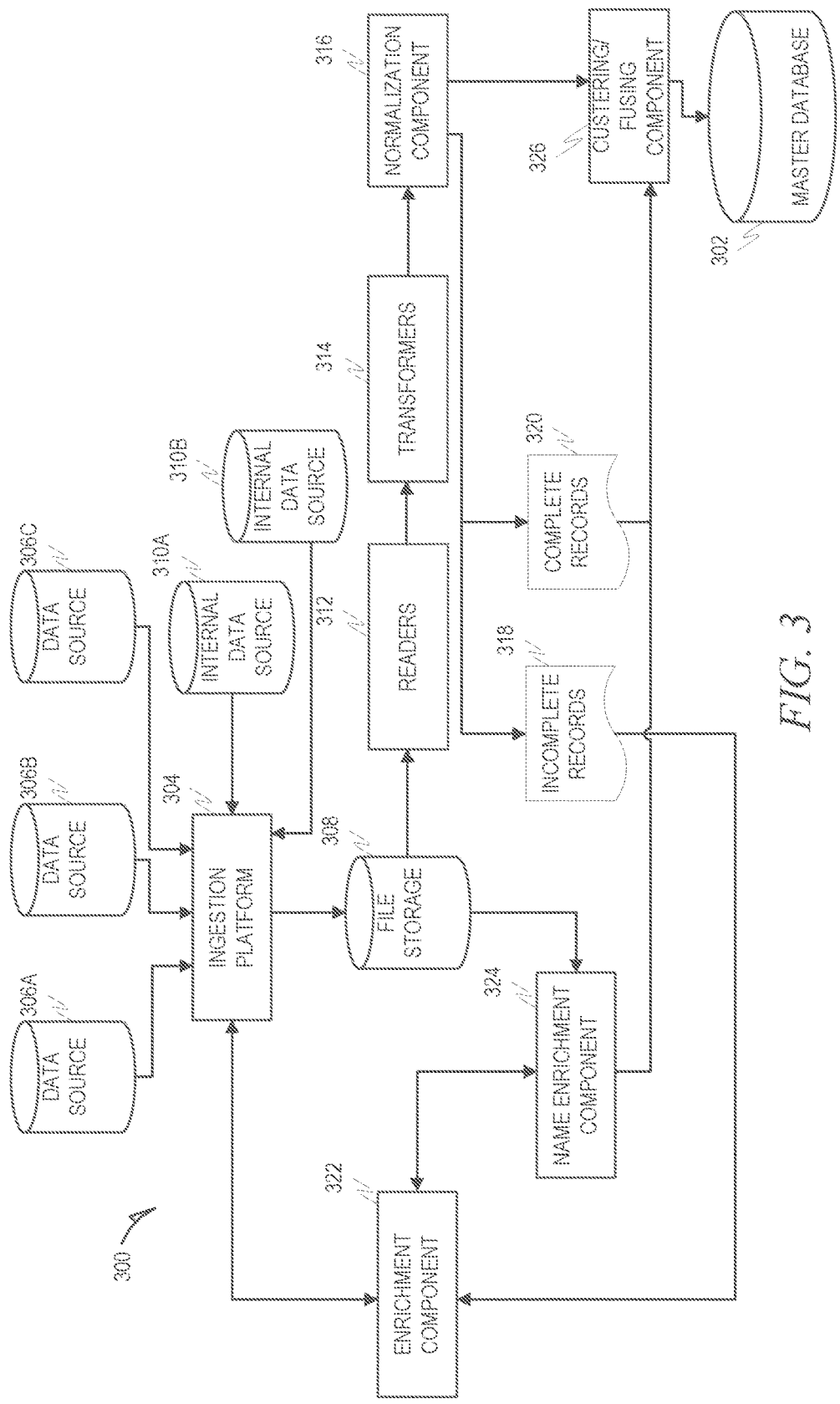
FIG. 3 is a block diagram illustrating a system for organization data enrichment in accordance with an example embodiment.

FIG. 3 is a block diagram illustrating a system 300 for organization data enrichment in accordance with an example embodiment. The output of the system 300 is enriched organization data stored in a master database 302. In an example embodiment, the master database 302 is the profile database 218 in FIG. 2 and thus the enriched organization data can be accessed and used by the application logic layer on the social networking system 210 in FIG. 2.

An ingestion platform 304 obtains data from one or more data sources 306A-306C. The ingestion platform 304, for example, either uses an API or scrapes publically accessible information for the data. The data may be stored in a file storage 308. In an example embodiment, the file storage 308 is a Hadoop Distributed File System (HDFS), which is designed to store large data sets reliably. Data can also be obtained via one or more internal sources 310A-310B. The internal sources 310A-310B may be trusted to be reliable and may represent, for example, databases operated by or in conjunction with the social networking service.

One or more readers 312 may be designed to read and parse the data in the file storage 308. One or more transformers 314 may then act to transform the data, no matter the source, into a single format. A normalization component 316 may then normalize the data. The output of the normalization component 316 may include incomplete records 318 and complete records 320. The incomplete records 318 can be passed to an enrichment component 322, where various techniques for enrichment may be performed using outside sources, which will be described in more detail later. This enrichment process may also include enrichment of an organization name field using a name enrichment component 324, which can access the file storage 308 to obtain social network profiles and other data used to aid in the name enrichment process. The name enrichment process will be described in more detail later.

The overall enrichment process conducted by the enrichment component 322 may output a set of updated records which are no longer incomplete. These may be fed to the ingestion platform 304 as if they were new records obtained by the ingestion platform 304, allowing the process of parsing, transformation, and normalization to be repeated on the newly enriched records, in case, for example, the enriched fields are in non-standardized formats.

The complete records 320 may be passed to a clustering/fusing component 326. The clustering/fusing component 326 acts to cluster together records that appear to be similar to each other (i.e., are likely to be duplicates, albeit with different values for some of the fields) and then fuse together records it determines are indeed duplicates of one another. This will be described in more detail below.

Normalization

Normalization of organization data includes various functions, including cleaning, validating, standardizing, and encoding the data. Ingested "raw" records may have inaccuracies or incorrect data. The normalization component 316 cleanses and standardizes the raw data to ensure that the data is uniform and meets a specific quality threshold. For example, does a country name match a global standard? Does a phone number match the specified country's format? Is the street address valid?

Figure 4:
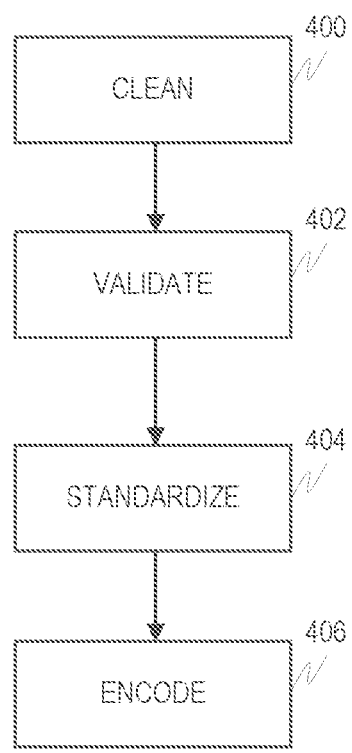
FIG. 4 is a flow diagram illustrating four processes of normalization in accordance with an example embodiment.

Normalization can be viewed as a series of four processes. FIG. 4 is a flow diagram illustrating the four processes of normalization in accordance with an example embodiment. The first process is cleaning 400. In the cleaning 400 process, records are cleaned to reduce errors in the fields. This may include, for example, removing extraneous characters such as spaces, punctuation, etc. and correcting typographical errors such as spelling errors or inconsistencies.

The second process is validating 402. In the validating 402 process, it is determined whether or not a record meets a particular quality threshold. A series of tests may be performed on the record to aid in this validation. The following are examples of tests that can be performed as part of the validating 402 process.

A first example test is a determination if particular mandatory fields are present in the record. In an example embodiment, these mandatory fields may include name, address, phone number, description, URL and logo. If, for example, at least one of these fields is missing, the record may be determined to be invalid. If all of these fields are present the validating 402 process may proceed to additional tests.

A second example test is a determination if the record contains a minimum number of fields. A particular threshold of fields may be set to indicate a reliable record. For example, the threshold may be 10 fields. This means that as long as the record contains any 10 fields, the test will be passed.

A third example test is a determination of whether particular fields in the record are valid. Certain fields can be validated using various techniques and sources. For example, an address field can be validated by looking up the address in a mapping database to determine whether the address actually exists. A similar lookup can be performed for a phone number. An organization name can be validated by looking up the name in a structured database, such as a state registry. For example, if the organization is listed as a corporation in the organization name (e.g., ends in "Inc." or "Corp."), state corporation databases may be queried to determine if the name actually matches a registered corporation. A logo, which is an image, may be validated by ensuring it meets particular minimum specifications for a logo, such as resolution and size. A URL may be validated by entering the URL in a web browser to determine whether a website actually exists having that URL.

If the third example test fails (i.e., if any of the examined fields are determined to be invalid), then the field(s) that fail the third example test may be treated as empty.

A third process is standardizing 404. In the standardizing 404 process, fields are standardized to a particular format. This format may reflect such items as length, presence of punctuation and spaces, ordering, etc.

A fourth process is encoding 406. In the encoding 406 process, the standardized fields are encoded in a format readable by whatever system will be reading the records ultimately. This may include a format readable by the enrichment component 322 and/or a governance, enrichment, data discovery, or other application.

Rejected records that do not meet a minimal quality threshold are considered incomplete records 318 and are passed to the enrichment component 322 for further enriching. Qualified records are considered complete records 320 and are passed to the clustering/fusing component 326.

After normalization, the normalization component 316 has created a set of complete records pertaining to entities, but an outstanding question is whether some of these records overlap with other records (i.e., whether two or more different records actually reflect information about a single organization despite differences between the records). Each record has a plurality of fields and some of these fields in a particular record may be identical to those fields in another record while some of the fields might be different, leading to a question as to whether the multiple records pertain to the same organization or whether they represent different organizations. This question may be answered through a clustering/fusing mechanism discussed as part of the clustering/fusing component 326 below.

Enrichment

The enrichment component 322 acts to enrich missing fields of the incomplete records 318. Of course, it is not necessary to enrich every missing field in an incomplete record. In an example embodiment, key fields are identified and enriched. What constitutes a key field may differ from embodiment to embodiment. In one example embodiment, a key field is one that is deemed to be necessary for an organization record to be useful for whatever purpose is attached to the organization record, such as by a governance application. In another example embodiment, a key field is one that is necessary in order for the clustering/fusing component 326 to accurately act on the record (i.e., be able to determine whether or not the record overlaps sufficiently with another record to fuse the records). In an example embodiment, there are six key fields for organization records: name, address, phone number, organization website (also known as Uniform Resource Locator (URL)), description, and logo.

Both address and phone number can be enriched using a state registry or other structured data source, once the name is known.

Organization Name Enrichment

In an example embodiment, an organization record can be enriched by automatically filling in a missing organization name field based on information from a social networking service. Specifically, member profiles in the social networking service may be mined for information may be used as an input to a supervised machine learning algorithm which assists in enriching the organization's name. In addition to the information within the member profiles themselves, usage information of each corresponding member in the social networking service may also be utilized. For example, activities such as updating a user profile, performing search functions, and utilizing social networking communications (e.g., email though the social networking service) may be tracked and measured. Each member may then be classified based on this usage information. For example, members who are especially active in the social networking service may be classified as "power members". This classification may then be used to weight the information in the corresponding member profiles. For example, information from profiles of power members may be given more weight by the supervised machine learning algorithm than information from profiles of non-power members.

A similar process can be used in situations where the organization name is not missing in an organization record, but rather there is some doubt as to whether the organization name in a particular organization record corresponds to the same organization as is listed in another organization record (e.g., whether they should be combined into a single record). Thus, the name enrichment component 324 may also provide output directly to the clustering/fusing component 326.

In an example embodiment, the name enrichment component 324 identifies organizations with which members of an online social networking service are associated. More specifically, the name enrichment component 324 retrieves information from member profiles and other information in the file storage 308 to aid in the name enrichment process. This information includes, but is not limited to (1) text strings from member records that act as identifiers for an organization with which a member is associated; (2) connection information specifying connections among members of the online social networking service; (3) location information for members of the online social networking service; (4) usage information of members of the online social networking service; and (5) Internet Protocol addresses of members when they log in to the online social networking service.

Figure 5:
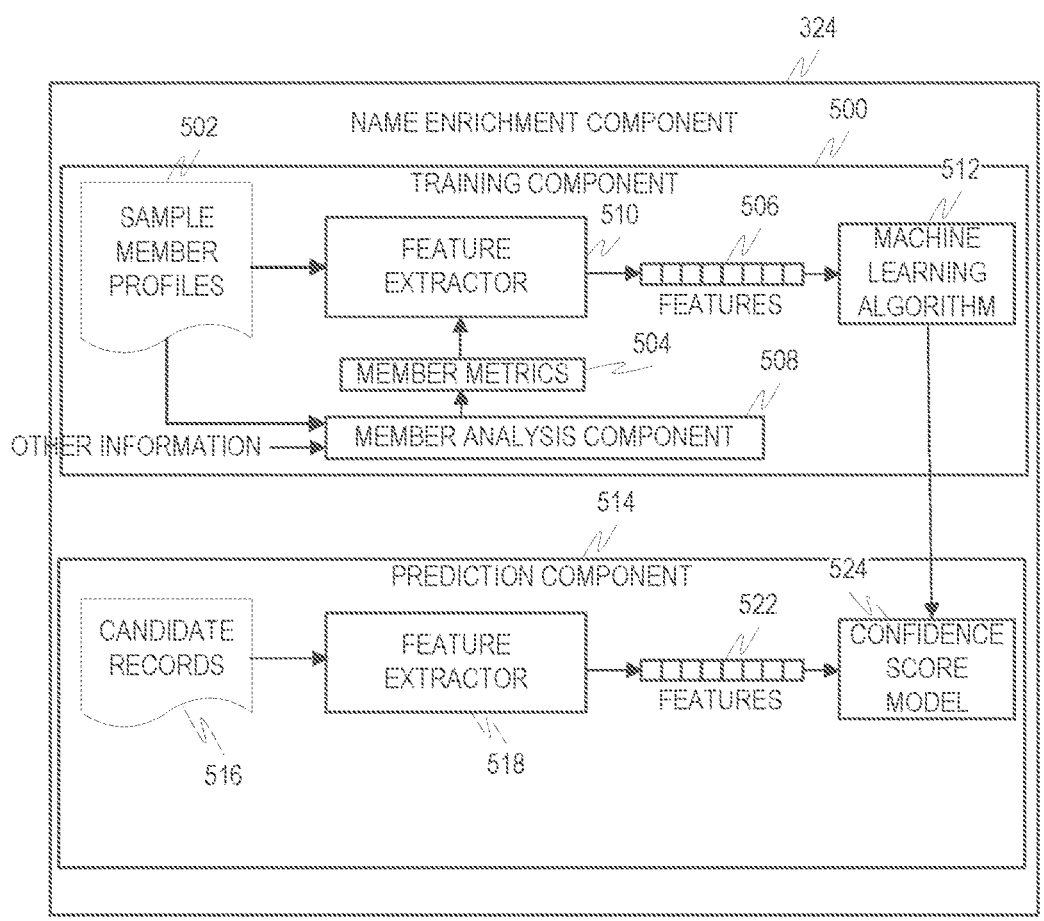
FIG. 5 is a block diagram illustrating a name enrichment component in detail in accordance with an example embodiment.

This information feeds into the name enrichment component 324, which uses it to identify organizations with which the members of the online social networking service are associated. FIG. 5 is a block diagram illustrating the name enrichment component 324 in more detail in accordance with an example embodiment. In a training component 500, sample member profiles 502 are fed to a feature extractor 510, which acts to extract curated features 506 from the sample member profiles 502. The sample member profiles 502 are also fed to a member analysis component 508, which analyzes the sample member profiles 502 as well as other member information such as member usage information and login information to calculate one or more member metrics 504 for each sample member profile 502. The one or more member metrics 504 are then fed to the feature extractor 510, which uses the one or more member metrics 504 to add one or more additional curated features 506.

Thus, for example, the feature extractor 510 may extract features such as organization name, member location, and member title directly from the sample member profiles 502. Additionally, the member analysis component 508 may analyze a member's profile and usage information to identify whether the member is a power user or not, and provide a metric based on this. This may either be a binary metric (i.e., the member is or is not a power user) or a non-binary metric (e.g., a score is assigned indicating how much of a power user the member is). This may be determined based on, for example, how complete the member profile is (e.g., what percentage of fields in the member profile have information in them), how often the member visits the social networking service, how often the member updates his or her member profile, how often the member emails other members through the social networking service, etc.

Furthermore, the member analysis component 508 may analyze a member profile as well as other member profiles to provide a connection density. The connection density metric is a value that indicates a level at which member connections from this member are within a single organization (e.g., the connection is between the member and another employee of the same organization). This can be accomplished in a number of ways. For example, one technique involves forming a "connection array" for the $n^2$ possible connection pairs for a group of size n. For each pair, the system looks at the connection data to determine whether the members are connected. If so, the system sets the corresponding entry in the connection array to one. Otherwise, the system sets the entry to zero. The system then computes the connection density by summing up all of the entries in the connection array, and then normalizes the sum by dividing by $n^2$.

Furthermore, the member analysis component 508 may analyze a member profile as well as other member profiles to provide an email connection density metric. The email connection density metric is a value that indicates a level at which an email address provided in the member profile contains a domain that matches a domain in email addresses of other member profiles in a group with the member profile. This may be calculated in a similar way to connection density as described above, except using domains of email addresses rather than connections. Thus, for each pair of members, the system looks at the email addresses of the members to determine whether they have email addresses that share a domain. If so, the system sets the corresponding entry in an email connection array to one. Otherwise, the system sets the entry to zero. The system then computes the email connection density by summing up all of the entries in the email connection array, and then normalizes the sum by dividing by $n^2$.

The result is that the feature extractor 510 uses the sample member profiles 502 and the one or more member metrics 504 to provide the curated features 506.

In an example embodiment, the curated features 506 are then used to train a machine learning algorithm 512 to calculate a confidence score that indicates the confidence that the organization name for a particular member record corresponds with an accurate organization name.

In a prediction component 514, candidate records 516 are fed to a feature extractor 518, which acts to extract curated features 522 from the candidate records 516. The curated features 522 are then used as input to an organization name confidence score model 524, which acts to provide confidence scores for organization names in the candidate records 516. How the confidence score model 524 is used and what candidate records 516 are fed to the feature extractor 518 may differ based on the intended use of the confidence scores. If the confidence scores are to be used by the clustering/fusing component 326, the candidate records 516 may be organization records that have completed organization name fields but where there is some doubt as to whether some of the candidate records 516 are redundant and can be combined. Thus, the candidate records 516 may include member profiles and member information for members who are listed as working for each organization in the candidate records 516 being considered. If the confidence scores are to be used by the name enrichment component 324 to add organization names to organization records that are missing organization names, the candidate records 516 may include member profiles and member information for members who are connected, in some way to the candidate records 516 (e.g., have matching email domains, organization URLs, locations, etc.).

It should be noted that while the feature extractor 510 and the feature extractor 518 are depicted as separate components, in some example embodiments they may be the same component. Additionally, a large number of different types of features could be extracted using the feature extractors 510 and 518.

Figure 6:
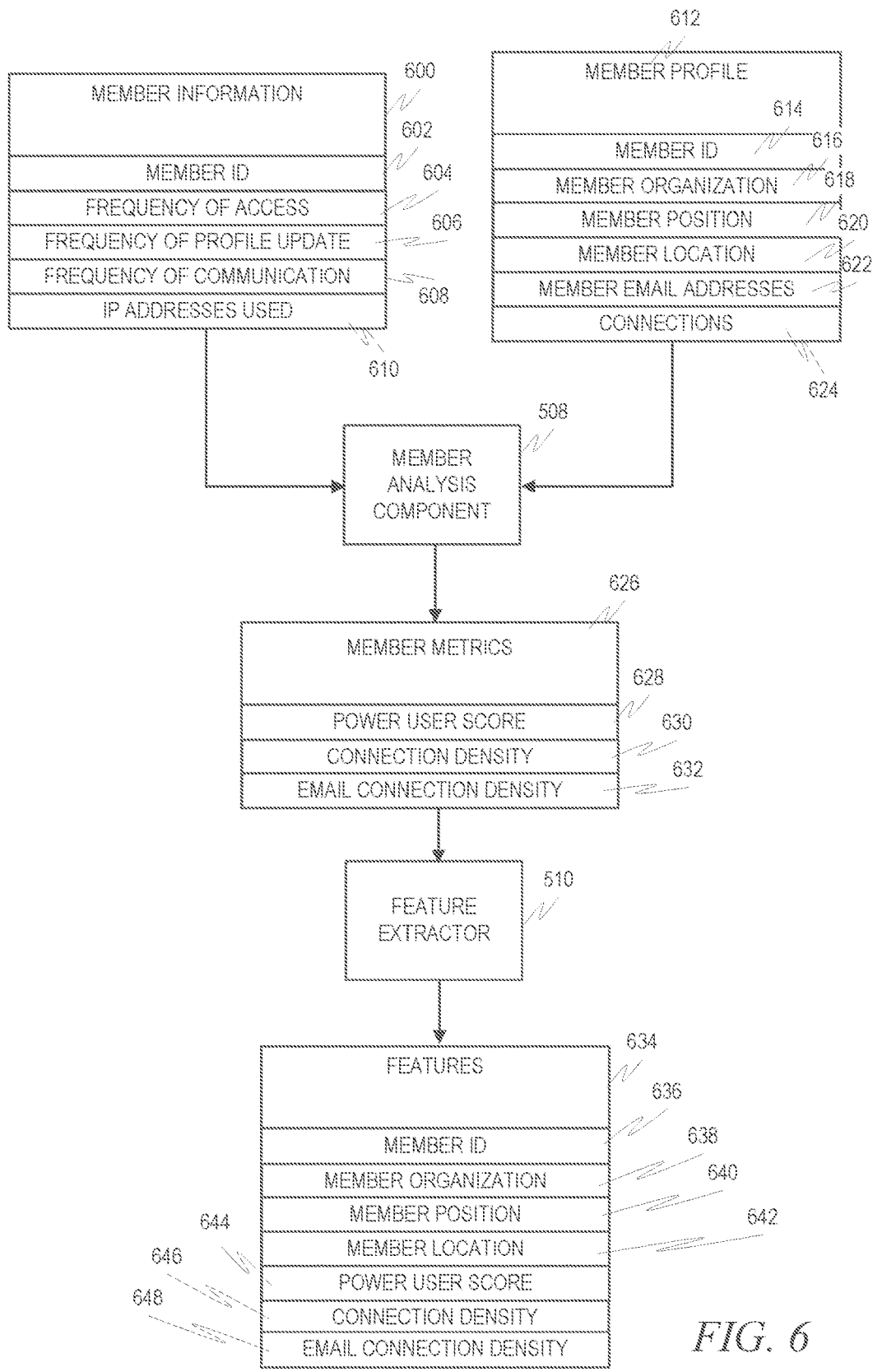
FIG. 6 is a diagram illustrating how member information can be used to identify an organization in accordance with the disclosed embodiments.

FIG. 6 is a diagram illustrating how member information 600 can be used to identify an organization in accordance with the disclosed embodiments. For each member of a social networking service, member information 600 can include: (1) a member identifier (ID) 602, which can include the name of the member and/or a numerical identifier for the member; (2) frequency of access 604 indicating how frequently the member accesses the social networking service; (3) frequency of profile update 606 indicating how frequently the member updates his or her member profile in the social networking service; (4) frequency of communication 608 indicating how frequently the member communicates with other members via the social networking service; and (5) IP addresses 610 utilized when the member accesses the social networking service.

Member profiles 612 may include information listed in member profile web pages stored on the social networking service. For brevity, not all fields of a member profile 612 will be listed here. The member profiles 612 may include fields such as (1) member identifier (ID) 614; (2) member organization 616 (if available); (3) member position 618; (4) member location 620; (5) member email address(es) 622; and (6) connections 624.

The member profiles 612 and member information 600 can be used as input to the member analysis component 508 which calculates member metrics 626 for each member profile 612. Here, the member metrics 626 include (1) power user score 628; (2) connection density 630; and (3) email connection density 632.

The feature extractor 510 then extracts features 634 from the member profile 612 and member metrics 626. Here, the features 634 include (1) member identifier (ID) 636; (2) member organization 638 (if available); (3) member position 640; (4) member location 642; (5) power user score 644; (6) connection density 646; and (7) email connection density 648.

The extracted features 634 can then be passed to a machine learning algorithm to train an organization name confidence model, or passed directly to the organization name confidence model to provide a confidence score that an organization name for the member profile is accurate.

Figure 7:
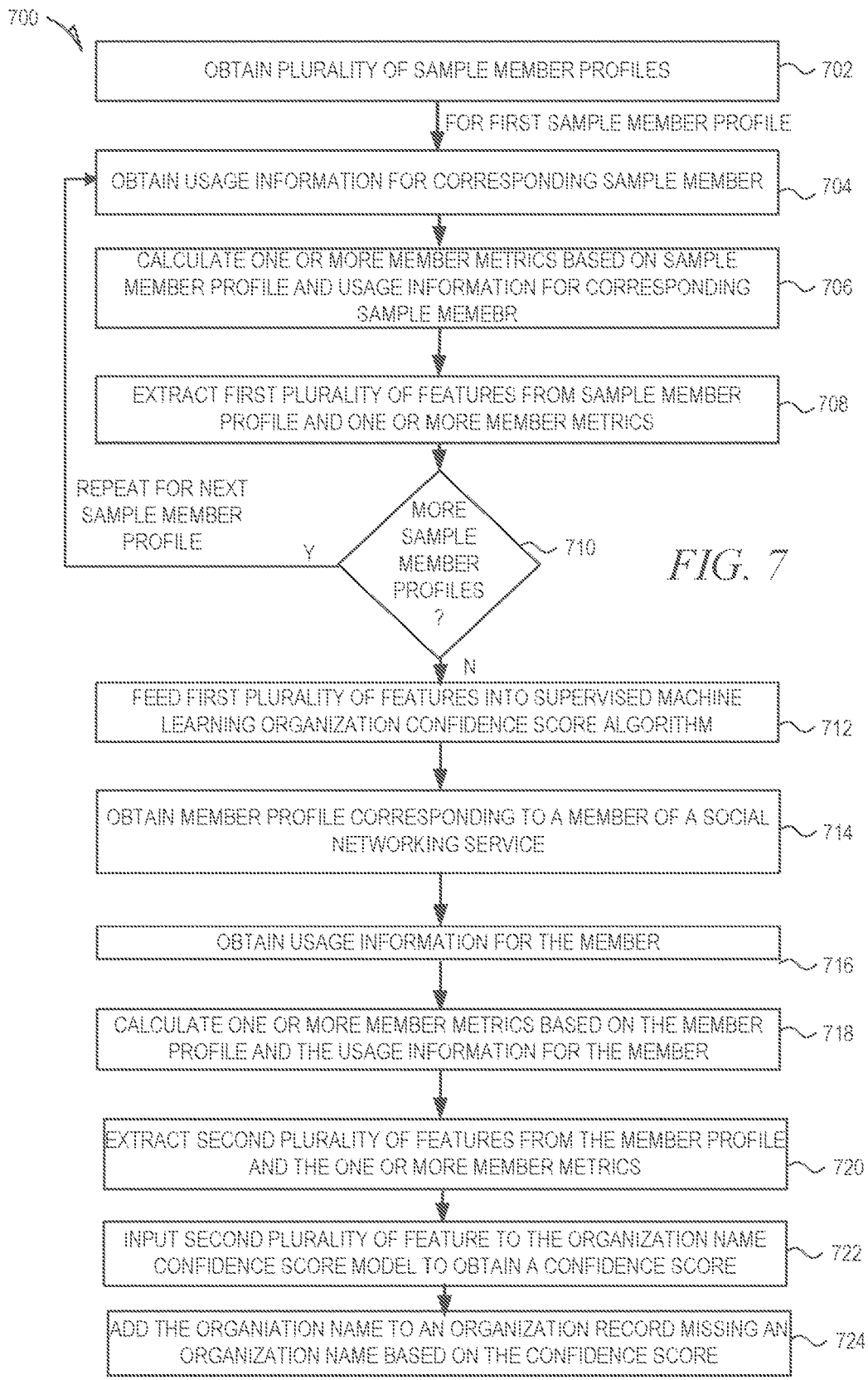
FIG. 7 is a flow diagram illustrating a method for enriching an organization name field of a record in accordance with an example embodiment.

FIG. 7 is a flow diagram illustrating a method 700 for enriching an organization name field of a record in accordance with an example embodiment. At operation 702, a plurality of sample member profiles are obtained, each sample member profile corresponding to a sample member of a social networking service. Then a loop is begun and cycled for each of the plurality of sample member profiles. Beginning with the first sample member profile, at operation 704 usage information for a corresponding sample member is obtained. Then at operation 706, one or more member metrics are calculated based on the sample member profile and usage information for the corresponding sample member. Then at operation 708, a first plurality of features is extracted from the sample member profile and the one or more member metrics. Then at operation 710, it is determined if there are any more sample member profiles. If so, then the process loops back to operation 704 for the next sample member profile. If not, then at operation 712 the first plurality of features is fed into a supervised machine learning organization confidence score algorithm to train an organization name confidence score model to calculate a confidence score for a particular member profile indicating a probability that an organization name in the particular member profile is accurate.

At operation 714, a member profile corresponding to a member of the social networking service is obtained. Then at operation 716, usage information for the member is obtained. At operation 718, one or more member metrics are calculated based on the member profile and usage information for the member. Then at operation 720, a second plurality of features is extracted from the member-profile and the one or more member metrics. At operation 722, the second plurality of features is input into the organization name confidence score model to obtain a confidence score for an organization name in the member profile. At operation 724, based on the confidence score for the organization name in the member profile, the organization name is added to an organization record that is missing an organization name, the organization record having at least one field matching a field in the member profile.

Organization URL Enrichment

Figure 8:
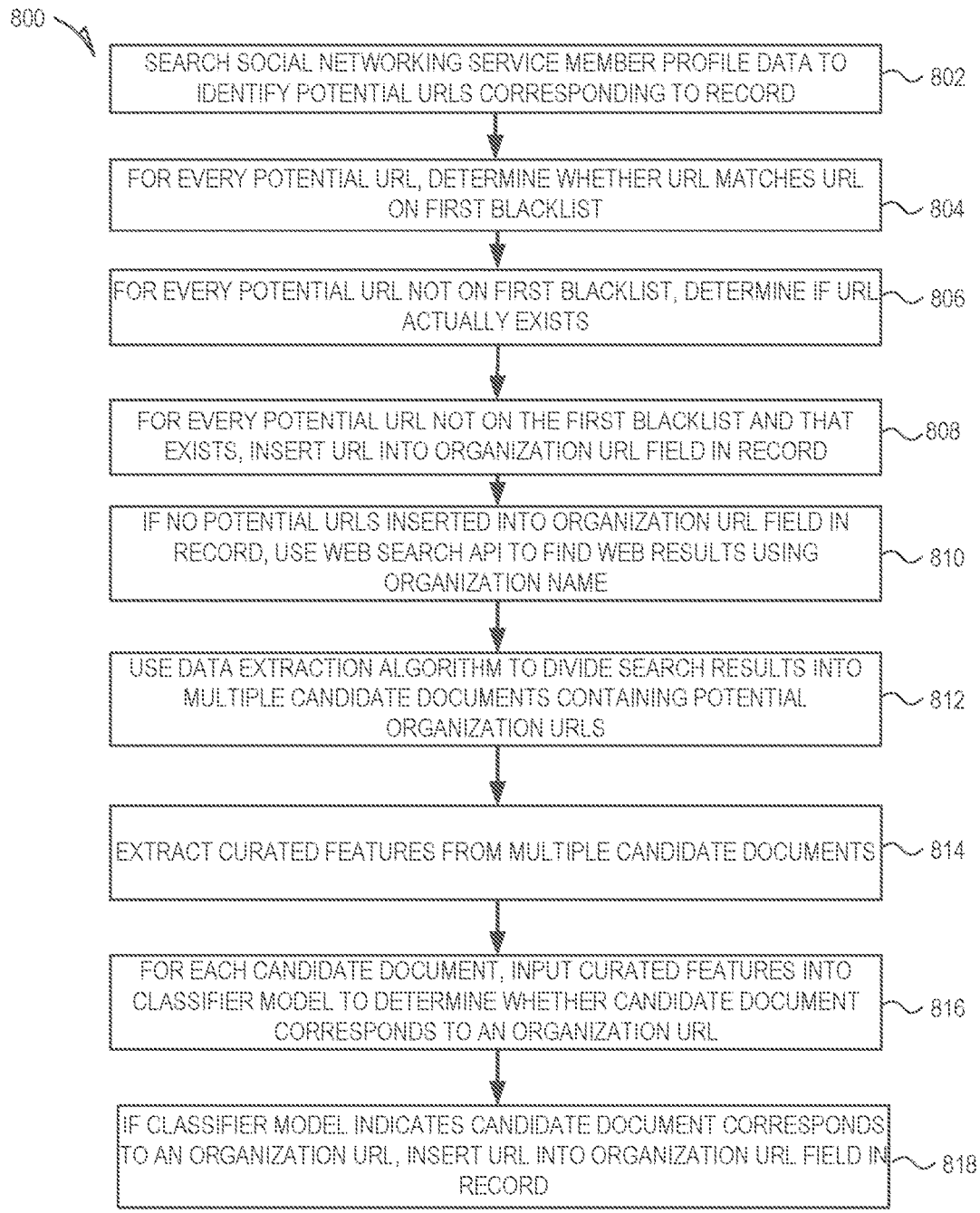
FIG. 8 is a flow diagram illustrating a method for enriching a URL field of an organization record in accordance with an example embodiment.

In an example embodiment, URL enrichment is performed for missing URL fields in the incomplete records 318. FIG. 8 is a flow diagram illustrating a method 800 for enriching a URL field of an organization record in accordance with an example embodiment. This method 800 assumes that an organization name exists in the record. As such, if an incomplete record 318 is missing an organization name it is desirable for it to first go through the organization name enrichment process using the name enrichment component 324 described above.

It should be noted, however, that it is possible that other organization records exist that correspond to the same organization, even if the organization name enrichment process has already been performed on a particular record. This is because clustering/fusing using the clustering/fusing component 326 has not yet been performed for the particular record. As such, it may be desirable to first perform social network mining to identify possible URLs corresponding to the record, as this likely would produce the most reliable information about an organization URL. Thus, at operation 802, social network member profile data is searched to identify potential URLs corresponding to the record. This may include, for example, looking at domain names located in email addresses (e.g., @linkedin.com) to determine whether a large number of people listed as employees at the organization have email addresses associated with a particular domain name. This may include only specifying URLs as candidates if a minimum number or percentage of social network member profiles associated with the organization contain email addresses with the URL as a root domain name. At operation 804, for each potential URL found in operation 802, it is determined whether the URL matches a URL on a first blacklist. The first blacklist may contain URLs of frequently used email address domains that do not correspond to particular organizations. For example, a large free email account provider may provide email addresses with domain names matching its own organization name, even if the people registering for the accounts do not work for that organization.

Assuming the URL is not contained on the first blacklist, at operation 806 it is determined whether the URL actually exists. This may be accomplished by inserting the URL into a web browser to determine if a page is returned. If so, then it is determined that the URL corresponds to the organization, and at operation 808 the URL is inserted into the incomplete record in the URL field.

If no URL is found using operations 802-808 (either because no candidates exist at operation 804, or because no candidates survive the blacklist test at operation 806 or the URL existence test at operation 808) then a classifier model created by a machine learning algorithm may be used to determine an organization URL from web search results. At operation 810, a web search API is used to search for web results using the organization name. The top X results may be retrieved, where X is set at a particular threshold (e.g., 10). Each web result contains a URL, page title, and short description of the matching content. For example, a search on the organization name "LinkedIn" may result in the following results (assuming, for ease of reading, that X is set to 4);

1) LinkedIn—Official Site
https://www.linkedin.com
300 million+ members|Manage your professional identity. Build and engage with your professional network. Access knowledge, insights and opportunities.
2) LinkedIn—Wikipedia, the free encyclopedia
en.wikipedia.org/wiki/LinkedIn
LinkedIn/. l i n k t. 'i n/is a business-oriented social networking service.
It was founded in December 2002 and launched on May 5, 2003, it is mainly used . . .
3) LinkedIn (@LinkedIn)|Twitter
https://twitter.com/linkedin
13.8K tweets•888 photos/videos•1.06M followers. Check out the latest Tweets from LinkedIn (@LinkedIn)
4) City of Sunnyvale|LinkedIn
https://www.linkedin.com/organization/city-of-sunnyvale
Learn about working at City of Sunnyvale. Join LinkedIn today for free.
See who you know at City of Sunnyvale, leverage your professional network, and get hired.

In an example embodiment, different permutations may be searched for each record to provide a detailed web search result set. For example, features such as location and industry for an organization may be extracted from member profile data and used in conjunction with the organization name as search queries to reduce the possibility of irrelevant search results being returned. For example, a general web search for "Main Street Antiques" may result in a large number of irrelevant web search results, as that organization name may be common across the country; however, a more specialized web search for "Main Street Antiques Astoria, Oreg." may return more relevant search results.

At operation 812, a data extraction algorithm is used to divide search results for the organization into multiple candidate documents containing potential organization URLs.

At operation 814, curated features are extracted from the multiple candidate documents.

At operation 816, for each candidate document, the curated features are input into a classifier model created by a machine learning algorithm (described below) to determine whether the candidate document corresponds to an organization URL.

At operation 818, if the classifier model indicates that the candidate document corresponds to an organization URL, the URL from the candidate document is inserted into an organization URL field in the record.

Figure 9:
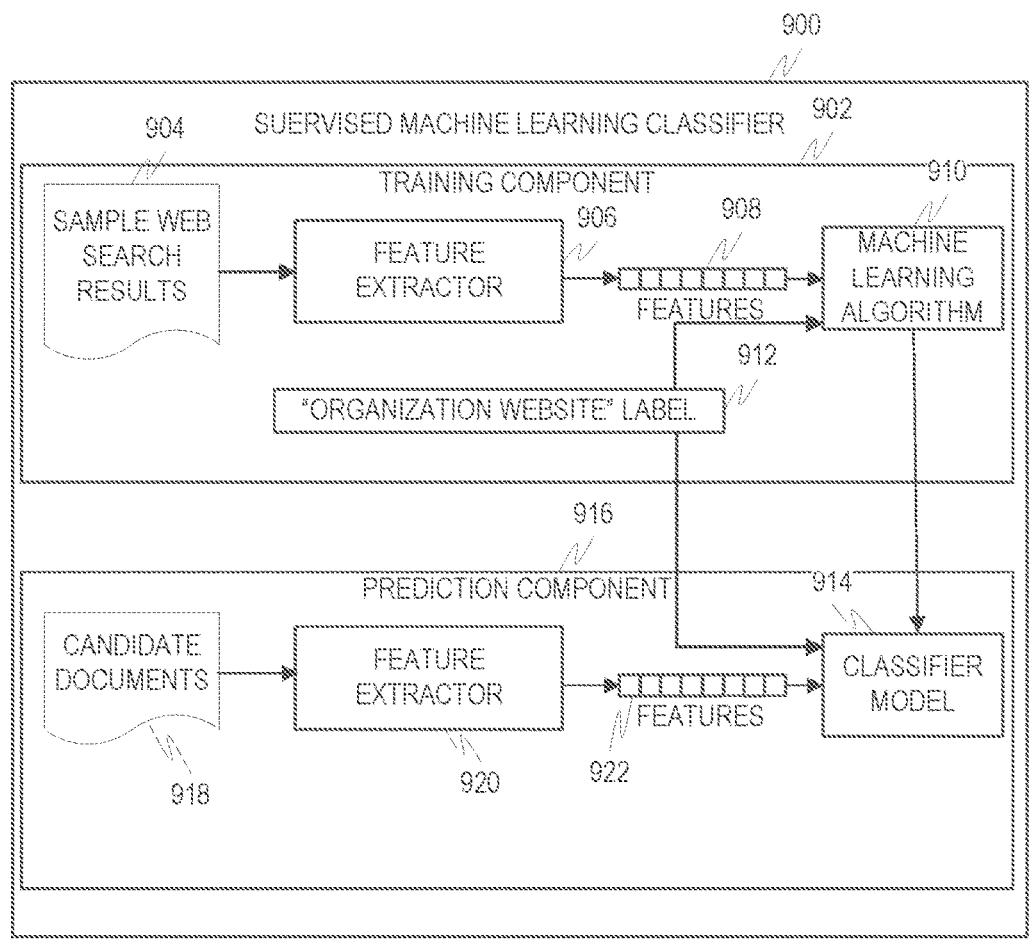
FIG. 9 is a block diagram illustrating a supervised machine learning classifier in accordance with an example embodiment.

FIG. 9 is a block diagram illustrating a supervised machine learning classifier 900 in accordance with an example embodiment. The supervised machine learning classifier 900 may be part of the enrichment component 322 of FIG. 3. In a training component 902, sample web search results 904 are fed to a feature extractor 906, which acts to extract curated features 908 from the sample web search results 904. The sample web search results 904 may be from a large set of web search results and may generally be in the same format as real-time web search results provided in response to web searches performed using the web search API. The curated features 908 are then used to train a machine learning algorithm 910 to recognize the difference between curated features 908 of a record that indicate that the record should be assigned a label 912 and curated features 908 of a record that indicate that the record should not be assigned the label 912. Here, for example, the label may be "Organization Website". The result of this machine learning algorithm 910 is a classifier model 914.

In a prediction component 916, candidate documents 918 containing potential organization website URLs (from operation 812 of FIG. 8) are fed to a feature extractor 920, which acts to extract curated features 922 from the candidate documents 918 The curated features 922 are then used as input to the classifier model 914, which acts to predict whether each candidate document 918 should be assigned the label 912.

It should be noted that while the feature extractor 906 and feature extractor 920 are depicted as separate components, in some example embodiments they may be the same component. Additionally, a large number of different types of features could be extracted using the feature extractor 906 and feature extractor 920. In an example embodiment, the features extracted by the feature extractor 906 (and ultimately used by the machine learning algorithm 910 to train the classifier model 914) include rank in search results, and a root stemmed URL frequency score from the sample web search results 904. In an example embodiment, the features extracted by feature extractor 920 (and ultimately used by the classifier model 914 in determining whether to label the candidate documents 918 with the label 912) include rank in search results, and occurrences of a root stemmed URL in this particular search result set.

Other possible features include similarity of search terms to the URL and title.

Rank refers to the order that the URL was listed in the search results, with first being the most relevant, then second, third, etc.

Occurrences of a root stemmed URL in a single search result set is the number of times a domain appears in each search's results. An accurate organization website will often be listed two or more times in search results, with a link to the root of the website and also a link to an about page or contact page in the search results. For example, in the example four search results above, linkedin.com appears twice (once at search result #1 and once at search result #4). Counts for a training set may be presented, for example, in the following format:

In [82]: df.f_root_url_count.value_counts( )
Out[82]:
1 66643
2 34486
4 120
6 102
3 84
5 45
dtype: int64

Frequently occurring root stemmed URLs are extracted by the feature extractors 906 and 920 because the more times a domain occurs in search results, the more likely it is to be a directory or other site that should not be an individual organization's website. This feature is effectively a negative mask to penalize these results. A threshold may be set, such as 500, indicating the minimum number of occurrences in the training set until the URL is deemed "frequently occurring." For example, a training set may have the following frequently occurring root stemmed URLs:

```
In [225]: bing.frequent_urls(bing.results_to_urls(infile),min_support=500)
Out[225]:
{
u'http://facebook.com':5547,
u'http://yelp.com': 4128,
u'http://yellowpages': 3733,
u'http://linkedin': 3553,
u'http://superpages.com': 2116,
u'http://en.wikipedia.org': 1472,
u'http://bbb.org': 1285,
u'http://start.cortera.com': 1202,
u'http://greatschools.org': 930,
u'http://bizapedia.com': 871,
u'http://bloomberg.com': 782,
u'http://local.yahoo.com': 746,
u'http://tripadvisor.com': 662,
u'http://indeed.com': 549,
u'http://citysearch.com': 536,
u'http://mapquest.com': 536
}
```

The supervised learning algorithm itself may utilize one or more learning algorithm techniques to classify the sample search results and create the model for classifying the runtime search results. Example supervised algorithms include Linear Support Vector Machine (SVM), Radial Basis Function (RBF) SVM, Decision Tree, Random Forest, AdaBoost and Naïve Bayes. Different classifiers can also be used, such as k-nearest neighbor, linear SVM classifier (SVC), kernel approximation, Stochastic Gradient Descent (SGD) classifier, and Naïve Bayes.

In an example embodiment, an ensemble method is utilized for the machine learning algorithm 910 and classifier model 914. This ensemble method utilizes a combination of Random Forest and Gradient Boosting. Random Forest was chosen for its smooth precision and recall curve near the target performance and for its parallelism if parallel computing is used to reduce computing resources. Parameters for the winning algorithm are optimized using a cross validated grid search to maximize performance.

The machine learning algorithm 910 may constantly track performance in order to train the classifier model 914 reliably. To measure performance, the following events are tracked and counted:

True Positive (TP): Correctly identified URL when present
True Negative (TN): No URL present
False Positive (FP): Identified incorrect URL
False Negative (FN): Overlooked and didn't choose correct URL Given these four numbers, the following metrics can be defined.

Precision, which indicates how many of the items that were identified were relevant, is TP/(TP+FP).

Recall, which indicates how many of the relevant items were identified, is TP/(TP+FN).

The F-Measure (or F-Score), which combines the precision and recall to give a single score, is defined to be the harmonic mean of the precision and recall: (2×Precision×Recall)/(Precision+Recall).

The classifier model 914 is trained to maximize the F-measure. For a fully automated system that, is publishing results live, it is desirable have the accuracy of predictions be as high as possible.

Organization Logo Enrichment

Locating a logo for an organization can be a difficult technical challenge. However, in an example embodiment, a supervised learning machine algorithm can be used to generate a classifier model that helps to predict whether a particular image in a website is the organization logo. This algorithm can be used to label the image as a logo without the need for rendering of the web page (and thus without the need for the performance hit caused by rendering a web page).

Figure 10:
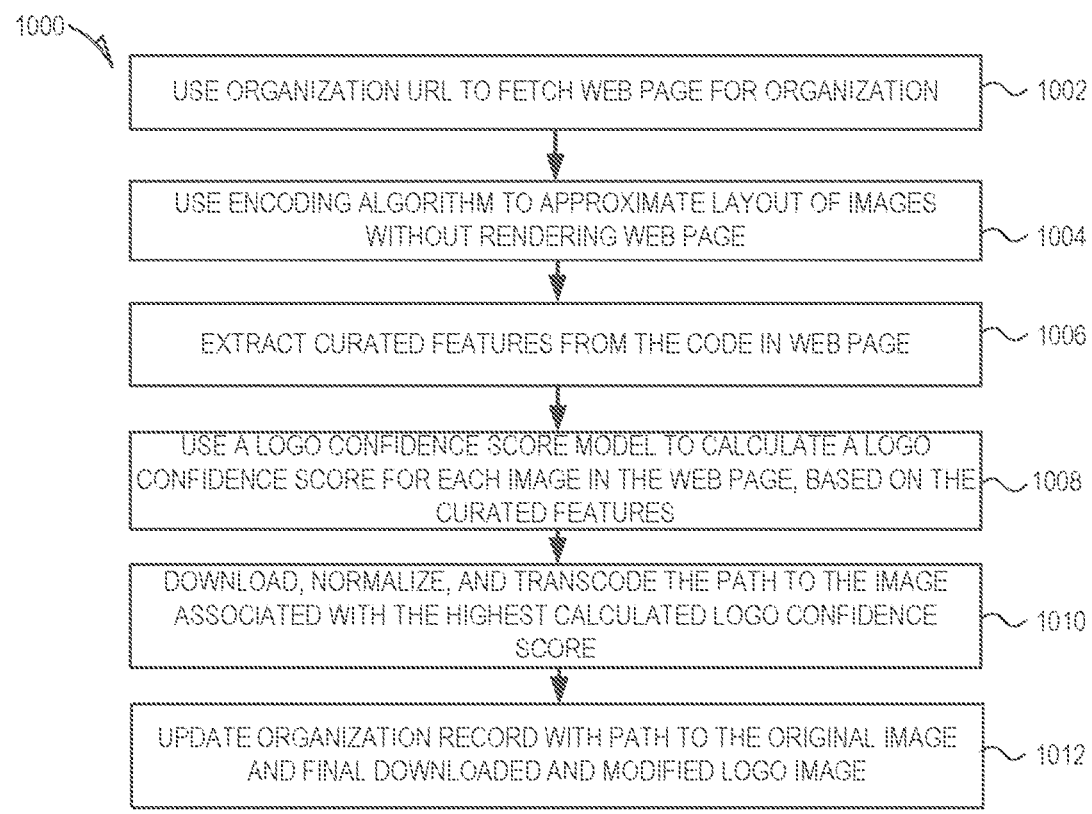
FIG. 10 is a flow diagram illustrating a method for enriching a logo field of an organization record in accordance with an example embodiment.

FIG. 10 is a flow diagram illustrating a method 1000 for enriching a logo field of an organization record in accordance with an example embodiment. The method 1000 assumes that a URL for the organization exists in the record. As such, if an incomplete record is missing a URL it is desirable for it to first go through the URL enrichment process using, for example, the process described above with respect to FIG. 8.

At operation 1002, the organization URL is utilized to fetch the web page for the organization. This may include, for example, hypertext markup language (HTML) code or a combination of HTML and cascading style sheets (CSS) code (or some other styling or dynamic content generating system). A custom parsing and data extraction algorithm can then be used to divide fragments of the HTML and/or CSS from the web page into multiple candidate documents, each candidate document containing an image that may or may not be an organization logo.

At operation 1004, an encoding algorithm is used to approximate the layout of the images without actually rendering the web page. At operation 1006, based on the approximate layout, curated features are then extracted from the code (e.g., tags) in the web page.

At operation 1008, a logo confidence score model created by a machine learning algorithm is used to calculate a logo confidence score for each image in the web page, based on the curated features. At operation 1010, the path to the image associated with the highest calculated logo confidence score is downloaded, normalized, and transcoded for publishing. At operation 1012, the organization record is updated with the path to the original image and the final downloaded and modified logo image.

Thus, for example, the HTML code may be:

```
<!DOCTYPE html>
<html lang="en-US" prefix="og: http://ogp.me/ns#">
```

-continued

```
<!--<![endif]-->
<head>
<meta charset="UTF-8" />
<title>Award winning ice cream - Bob&039;s Ice Cream San
JoseBob&039;s Ice Cream | 40 Years In San Jose</title>
<link rel="stylesheet" type="text/css" media="all href="
http://bobsicecream.com/wp-content/themes/2 - 11bobs/style.css" />
<meta name="description" content="Handmade, high-end,
award winning ice cream
in the San Jose area|" />
<link rel="canonical" href="http://bobsicecream.com/" />
...
```

This HTML code is parsed, separating each tag into its own line, and then the image tags are pulled from the HTML, while preserving the order in the page, resulting in the following:

```
<img src="http//example.com/wp-content/uploads/
  2014/09/examplelogo3.png"
  alt="Example Inc." />
...
<img width="970" height="350"
  src="http://exampleinc.com/wp-
  content/uploads/2014/09/Example-Inc.jpg"
  class="attachment-post-thumbnail wp-
  post-image"alt="Example Inc" title="Example Inc" />
...
<img width="970" height="350"
  src="http://example.com/wp-
  content/uploads/2011/09/slide4.jpg"
  class="attachment-post-thumbnail
  wp-post-image"
  alt="slide4" title="slide4" />
...
```

Referenced CSS files are then extracted, and additional requests are made to each CSS tile to capture the response body. For each CSS file, the CSS rules that are applicable to images are parsed, such as background and background-image.

```
/* Wrap
-------------------------------------------------------- */
#wrap {
  background: url(images/bottom-bg.png) no-repeat right bottom;
  margin: 0 auto;
  width: 100%;
  padding; 0;
}|
```

An Xpath expression is then generated to select HTML tags from the main HTML page. The first occurrence of an HTML tag decorated by the CSS rule is selected, preserving its order in the DOM (the order is used to approximate layout without rendering). Image candidates from the HTML and image candidates from the CSS are then merged and sorted, preserving the order in the DOM. This results in a list of all image candidates, such as the following:
[<LogoCandidate(10, u'/template/img/logos/logo_132/32_2.png','<div class="logo">/n<div>')>,
LogoCandidate(16, u'/images/li-picutre.jpg', '<img scr="images/li-picture.jpg" style="height: 180px; width: 90;" alt="LinkedIn"|)>,
<LogoCandidate(21, u'/template/img/footer.png', '<div class="footer">/n<div>')>]
Supervised machine learning is then used to perform logo confidence score calculations on all extracted image candidates from the web page. The approach is to build a large training set of positively and negatively labelled samples assigned various sample logo confidence scores, and generate features for each sample to fit a learning model to the training data that generalizes to unseen data. The logo confidence score model takes new candidate images, generates features for these candidate images, and generates a logo confidence score for each candidate image.

Figure 11:
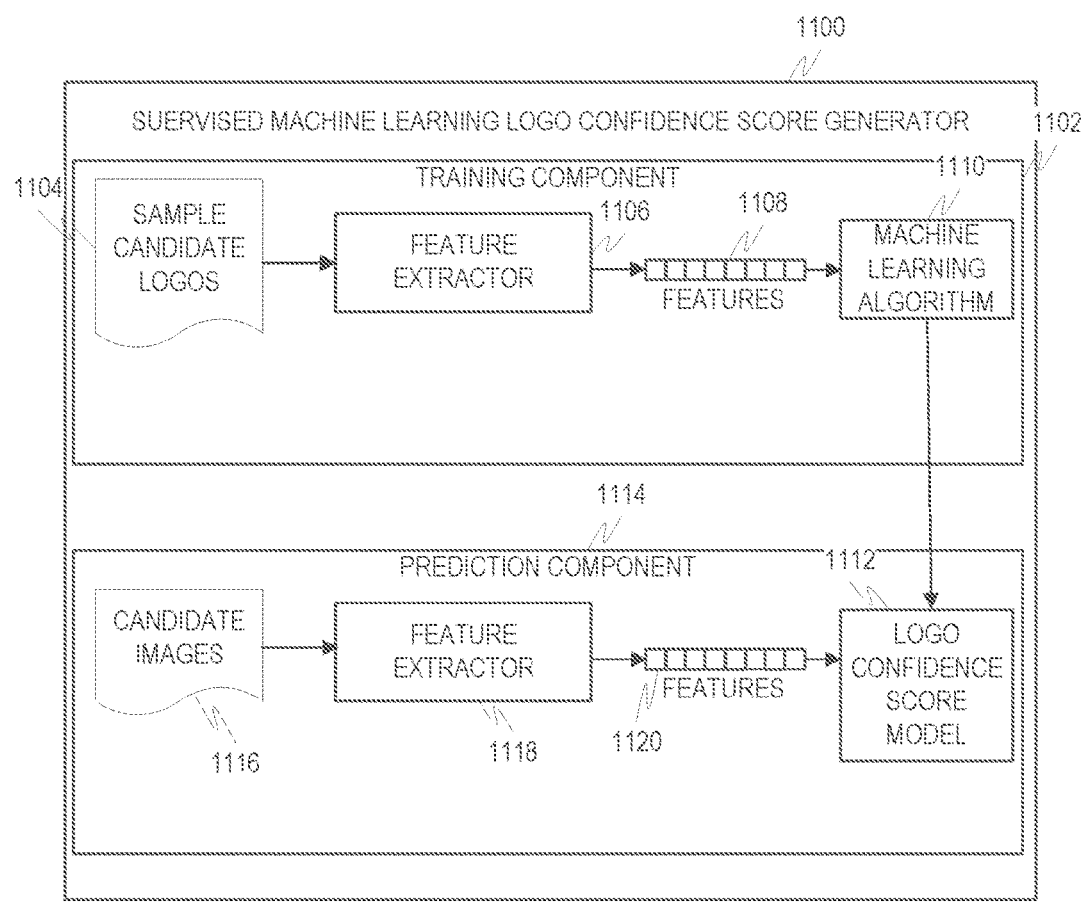
FIG. 11 is a block diagram illustrating a supervised machine learning logo confidence score generator in accordance with an example embodiment.

FIG. 11 is a block diagram illustrating a supervised machine learning logo confidence score generator 1100 in accordance with an example embodiment. The supervised machine learning logo confidence score generator 1100 may be part of the enrichment component 322 of FIG. 3. In a training component 1102, sample candidate logos 1104 are fed to a feature extractor 1106, which acts to extract curated features 1108 from the sample candidate logos 1104. The sample candidate logos 1104 may be from a large set of web pages. The curated features 1108 are then used to train a machine learning algorithm 1110 to create a logo confidence score model 1112 to calculate logo confidence scores for additional images. It should be noted that the sample candidate logos 1104 may be assigned sample scores to be used in the training. These sample scores may reflect the likelihood that the associated linages are logos. In some instances, these scores may be assigned directly by administrators or other humans. In other instances, the administrator or humans may assign general categories (e.g., logo, not logo, likely logo, not likely logo, etc.) and the supervised machine learning logo confidence score generator 1100 can assign sample scores based on the general categories.

In a prediction component 1114, candidate images 1116 containing potential organization logos are fed to a feature extractor 1118, which acts to extract curated features 1120 from the candidate images 1116 and underlying website data. The curated features 1120 are then used as input to the logo confidence score model 1112, which acts to calculate logo confidence scores for each candidate image 1016.

It should be noted that while the feature extractor 1106 and the feature extractor 1118 are depicted as separate components, in some example embodiments they may be the same component. Additionally, a large number of different types of features could be extracted using the feature extractor 1106 and feature extractor 1118.

There are two main types of features:

(1) Curated features. These indicate some piece of knowledge similar to what a human observer might use to identify a logo, such as where it is on the page, or some contextual clue in the markup text such as an image tag with a title similar to the name of the organization. Curated features may include the following:

Top proximity—A lightweight approximation of layout and order is used to rank images based on how close they are to the top of the page Image dimensions—Various sources are used to infer the image height, width, and area of each candidate, including CSS style, tag height and width attributes, and filename patterns Contained by a root link—images that are or are contained by a tag linking to the main website are likely logos Organization name similarity to image filename Organization name similarity to various HTML tag and surrounding tag attributes, including id, title, class, alt Organization name token count shared with filename Organization name token count shared with various HTML tag and surrounding tag attributes, including id, title, class, alt (2) Sparse vector of hundreds of generated "bag of words" features. These features include frequently occurring tokens that are positively or negatively correlated to with a logo. These are extracted from the filename, markup, or surrounding markup for each sample. Examples include the following:

Positive: 'logo', 'header', 'top', 'banner'
Negative: 'spacer', 'button', 'facebook', 'twitter'

FIG. 12 is a diagram illustrating an example of features extracted for candidate images in accordance with an example embodiment. The candidate images are identified in column 1200. The logo confidence score, once calculated, is placed in column 1202. The image tag is replicated in column 1204, and columns 1206-1222 are features extracted about each candidate image. It should be noted that there may be hundreds of such features and thus only a portion of the possible features are depicted in this example.

Figure 13:
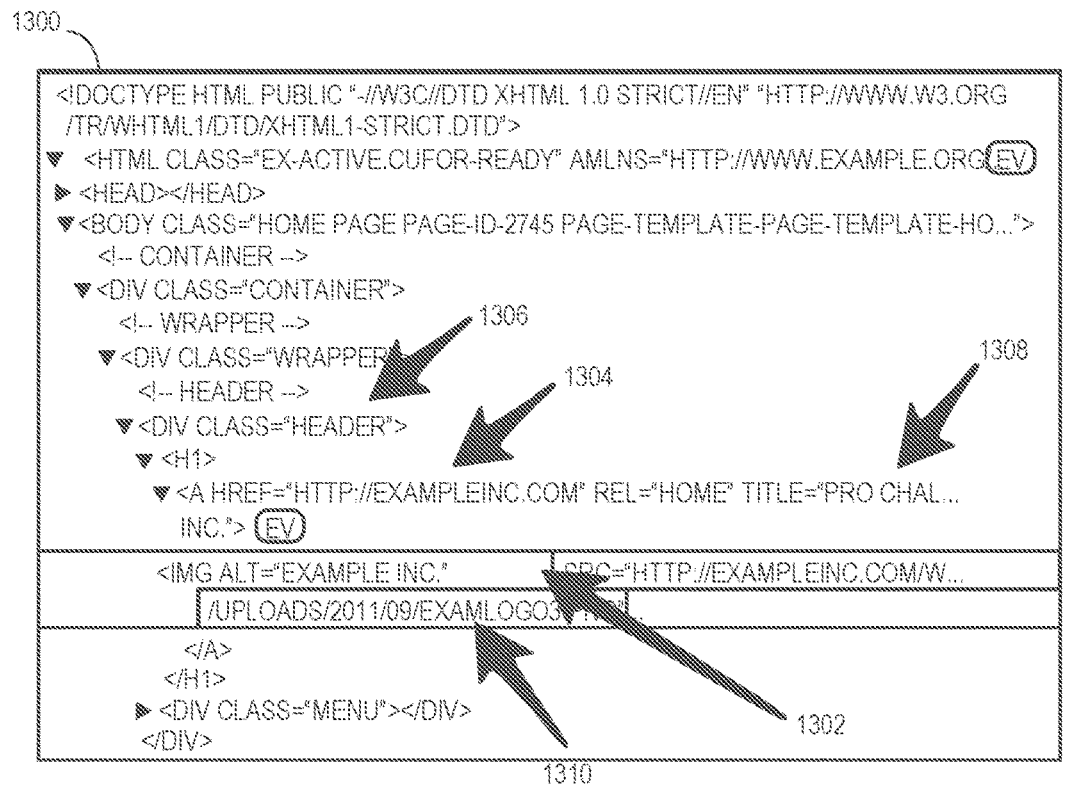
FIG. 13 is a diagram illustrating an example web page in accordance with an example embodiment.

FIG. 13 is an example web page 1300 in accordance with an example embodiment. The example web page 1300 includes an example candidate image via its corresponding tag 1302, the path to the source image file 1304, and contextual clues from the code, including an indication 1306 that the image is in a header, an indication 1308 that the image has a title matching the organization name, and an indication 1310 that the image file name contains the term "logo".

Organization Description Enrichment

A description for an organization can be automatically deduced by fetching the company web page(s) using the company URL. An issue exists, however, in determining which text on the company web page(s) correspond to a company description. A machine learning algorithm can be used to train a description model in a similar fashion to how the classifier model 914 is trained, as described above. Sample descriptions from company websites may be data mined to construct features for classifying descriptions. Each candidate description can be labeled as "good" or "bad" and the training data passed to a machine learning algorithm.

Features extracted for training and for runtime may include word count (candidates that are too short or too long are likely bad candidates), keyword to null word list ratio (if there are too many non-keywords between each pair of keywords, the candidate is likely a bad candidate), presence of blacklist phrases such as "insert description here" and "registered by" or spam phrases, and language (most company descriptions are in English).

The description model can then be used to label real-time candidate descriptions extracted from a website retrieved using an organization URL in an organization record missing a description.

Clustering/Fusion

As described above, after normalization, the normalization component 316 has created a set of complete records pertaining to entities, but an outstanding question is whether some of these records overlap with other records. Clustering/fusion (also known as orchestration) mainly focuses on solving two problems: record linkage and data fusion. Record linkage aims at linking records that refer to the same organization, even if the records do not appear identical. Data fusion selects trustworthy attributes from various records that refer to the same organization to form a "golden" record of the organization.

FIG. 14 is a diagram illustrating an example of record linkage in accordance with an example embodiment. Various records 1400 may or may not represent groupings/clusters of records pertaining to the same organization. Records 1402-1410 pertain to the same organization ("IBM"), even though the records are not identical. Likewise, records 1412-1414 pertain to the same organization (Distribution Services) and records 1416-1418 pertain to the same organization (MyHills). The challenge is in determining when records actually do pertain to the same organization versus when the records pertain to different organizations despite some similarity with each other (e.g., same organization name, same address, etc.). A clustering algorithm may be utilized to identify clusters of records that should be considered as a group pertaining to a single organization. This clustering algorithm will be discussed in more detail below.

FIG. 15 is a diagram illustrating an example of record fusion in accordance with an example embodiment. Here, the clusters identified by the clustering algorithm can each be fused into a single organization record, but the challenge becomes which values to choose for the fields of the single organization record. For example, for the first cluster 1500, which pertains to the organization "IBM", the record fusion process includes selecting what should be used as the organization name in the organization name field for the single organization record. There are 4 different organization names in the records 1402-1410 comprising the first cluster 1500 (including "International Business Machines Corp", "International Business Machines Corp (IBM)", and "IBM"). Thus, a technical challenge is presented in determining which name to choose. Similar challenges occur with the other fields.

Indeed, there are a number of technical problems encountered with record linkage and fusing. First, as described above, record linkage usually involves clustering, which involves dividing a large data set into a number of pair-wise comparisons (e.g., each record is compared with each other record). This results in $N^2$ comparisons, with N being the number of records in the data set. If the data set is quite large (e.g., 1,000,000 records), this number of comparisons can be infeasible without clogging computing resources. Additionally, constructing a good training and evaluation data set to be used for supervised record linkage can be difficult, since in this instance most pairs of records will clearly be non-matches. Additionally, some ambiguous pairs are difficult to analyze, even for humans.

The primary challenge of record linkage is recognizing records that refer to the same organization. This may be accomplished by computing a similarity measure between records and then clustering closely linked records to represent an organization.

In an example embodiment, the similarity function may be learned as a supervised learning model, such as a Random Forest Model trained with human-labeled examples. Each example contains some features and a label, and Random Forest learns a mapping function (i.e., the similarity function) from features to labels, with minimal errors. In this case, features correspond to attribute-wise similarities between any pair of records, and the label indicates if a pair of records are similar as recognized by the human raters.

Note that this approach enables human raters to correct existing labels and to add new training instances, thus allowing constant model refinement.

After the similarities between pairs of records have been computed, weak connections beneath a certain similarity threshold are filtered out. The remaining pairs of records are then clustered using agglomerative hierarchical cluster analysis. This clustering can be performed using a framework that makes it convenient to adjust the size of clusters as desired.

From a technical perspective, record linkage includes four steps: 1) fuzzy join (computing the attribute-wise similarity between pairs of records); 2) edge refinement (computing the similarity between pairs of records); 3) clustering (grouping of similar records); and 4) cluster quality evaluation (determining the quality of generated clusters).

The fuzzy join step computes attribute-wise similarities between organization records. In an example embodiment, the attributes considered include the following:
1. Organization Name
2. Organization Address
3. Organization Phone Number
4. Organization URL All of these attributes have text values. In an example embodiment, Term Frequency-Inverse Document Frequency (TF-IDF) similarity analysis is performed on the text data, to ensure that the computational result is not dominated by highly frequent tokens or affected by many rare tokens, including but not restricted to typos.

It is computationally expensive to compute similarities for every record pair on every listed attribute. An effective pruning strategy is to avoid similarity computation between records that do not share any common tokens. The purpose of building an inverted index is to greatly reduce the number of similarity computations and only measure similarity between pairs of records that share common tokens.

In an example embodiment, referring to attribute values of "documents", a mapper tokenizes the documents and emits pairs (token, doc_id), where doc_id is composed of source_id, record_id, attribute_name, and variant_id. Note that each attribute value can have multiple values (e.g., multiple phone numbers) and we use variant_id to identify a value. A reducer consumes the pairs emitted by the mapper and computes the token frequency of each token in each document. The output is in the form (token, doc_id, freq).

The mapper then computes the TF-IDF weight for each token based on the token frequency information of each document that contains the token. For each document, a reducer assembles the tokens appearing in the document with their TF-IDF weights. The output is in the form (doc_id, token+tfidf_weight).

The mapper then removes long-tail tokens with low weights and normalizes weights for each document The weight threshold for the long-tail tokens is a configurable variable called "shrinkage threshold". The reducer aggregates normalized TF-IDF scores for each token. The output is in the form (token, doc_id+norm_weight).

The mapper then calculates a partial similarity score contributed by each token. The reducer aggregates partial scores for record pairs. Pairs of records with similarity above a predefined threshold are identified and labeled "similarity threshold."

The final output format is a similarity matrix, with each row having the following format:
1. cosine_similarity double
2. source1 string
3. source_record_id1 string
4. token_type1 string comment 'N|A|P|U'
5. variant_id1 int comment 'variants'
6. source2 string
7. source_record_id2 string
8. token_type2 string comment 'N|A|P|U'
9. variant_id2 int comment 'variants'

The similarity measurement may be defined as follows:

$$sim(d_i, d_j) = \Sigma_{t \in V}(w_{t,d_i} \cdot w_{t,d_j})$$

A document d is represented as a vector $W_d$ of term weights $w_{t,d}$, which indicate the importance of each term t in the document, ignoring the relative ordering of terms ("bag of words" model). $sim(d_i, d_j)$ is the similarity between documents $d_i$ and $d_j$, and V is the term set. In the vector space model, normalized cosine similarity carries exactly the same form. In this type of similarity measure, a term will contribute to the similarity between two documents only if it has non-zero weights in both. Therefore, $t \in V$ can be replaced with $t \in d_i \cap d_j$ in the equation above. For example, if a term appears in documents $d_1$, $d_2$, and $d_3$, it contributes only to the similarity scores among these 3 documents (i.e., <d1, d2>, <d1,d3>, <d2,d3>).

To get normalized similarity scores, the TF-IDF weights can be normalized. Let $w'_k = w_k/((\Sigma_{k=1}^{n} w_k^2)^{1/2})$, so that $(\Sigma_{k=1}^{n} w'_k{}^2)^{1/2} = 1$. Such normalization guarantees that cosine similarity between any two documents is bounded by 1. Additionally, less important terms (terms with low weight) can be pruned to further improve the efficiency.

$$\|d_i\|_2 = \left(\sum_{k=1}^{n} w_k^2\right)^{1/2} \geq \tau \geq \left(\sum_{k=1}^{m} w_k^2\right)^{1/2}$$

$$(m < n, w_1 \geq w_2 \geq \ldots \geq w_n)$$

$$\|d'_i\|_2 = \left(\sum_{k=1}^{m} w'_k{}^2\right)^{1/2} = 1$$

$$\left(w'_k = w_k \Big/ \left(\left(\sum_{k=1}^{m} w_k^2\right)^{1/2}\right)\right)$$

After removing those tail non-important terms, the remaining TF-IDF weights are renormalized.

In the final stage of the fuzzy join step, documents which share the same term will be pawed up, and their weights will be joint to partially contribute to the final score. A reducer will then accumulate all the partial scores for each pair of documents sharing some common term.

$$sim(d_i, d_j) = \sum_{t \in d_i \cap d_j} w_{t,d_i} * w_{t,d_j}$$

If the accumulated score is larger than a user specified threshold, the system may consider the pair of documents as a potential match on a key blocking attribute (e.g., Name, Address, or Name+Address). Due to the trade-off between efficiency and accuracy, the computed cosine similarity can be relatively low for some documents. Therefore, a relatively low threshold may be set here to allow more candidates to be examined in the following stages.

The pairwise similarity problem can be expressed as four MapReduce jobs. Each subsequent job takes the output of the previous job as its input.

(1) Inverted Index

Figure 16:
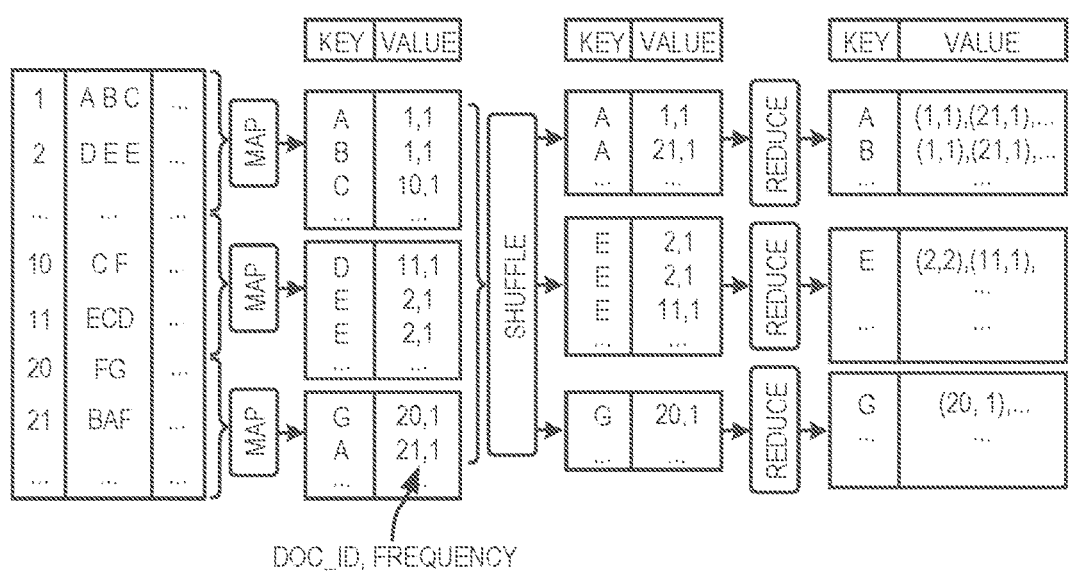
FIG. 16 is a diagram illustrating the creation of an inverted index in accordance with an example embodiment.

Here, an inverted index is built, where each term is associated with a list of doc_ids. Taking all the records as the input, the mapper tokenizes the documents (e.g., names) into terms and emits the term as the key, and a tuple consisting of the doc_id and term frequency as the value. The output is in the form (term, [(doc_id, freq), ... ]). FIG. 16 is a diagram illustrating the creation of an inverted index in accordance with an example embodiment.

(2) TF-IDF

Figure 17:
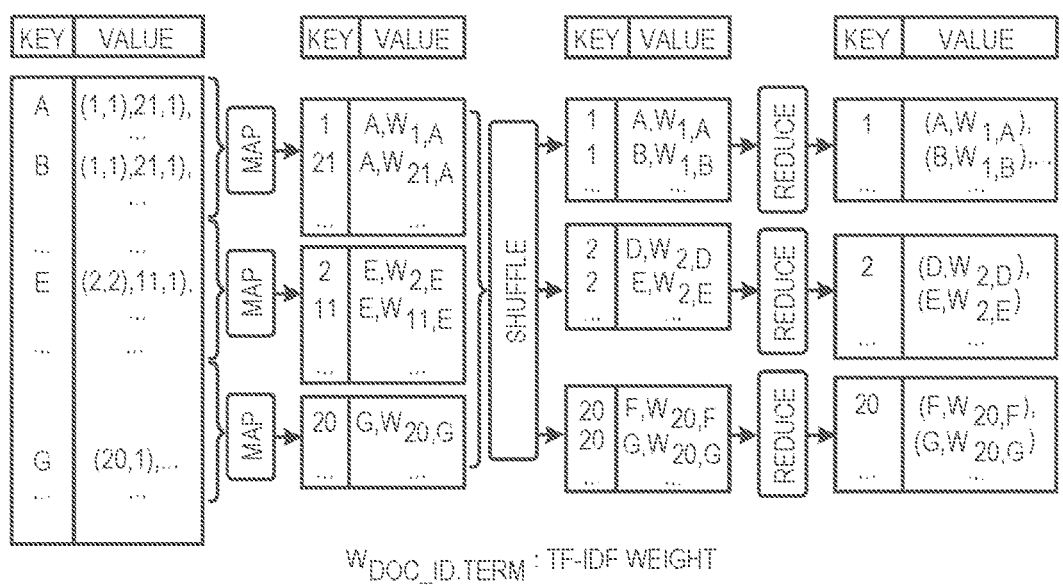
FIG. 17 is a diagram illustrating the computation of a TF-IDF weight in accordance with an example embodiment.

The mapper computes the TF-IDF weight for each term based on the term frequency information of each document that contains the term. For each document, the Reducer assembles the terms with their TF-IDF weights appearing in the document. The output is in the form (doc_id, [(term, TF-IDF weight), . . . ]). FIG. 17 is a diagram illustrating the computation of the TF-IDF weight in accordance with an example embodiment.

(3) Normalized TF-IDF

Figure 18:
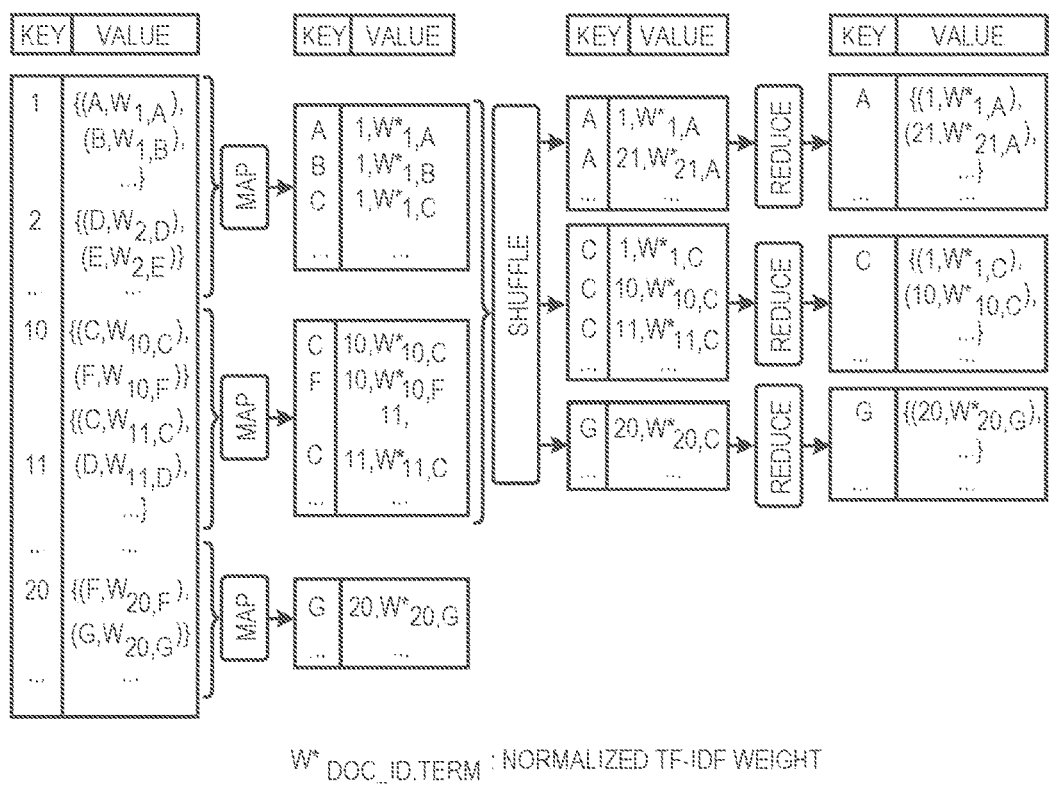
FIG. 18 is a diagram illustrating the computation of a normalized TF-IDF weight in accordance with an example embodiment.

In order to get a normalized similarity score (neatly bounded in [0,1]), another MapReduce job is introduced to calculate a normalized term weight for each unique term in each document. The mapper takes all the terms and their associated weights for each document, and calculates their normalized TF-IDF weights. The reducer inversely aggregates all the documents sharing the same term and populates the corresponding normalized TF-IDF weights. The output is in the form (term, [(doc_id, norm_weight), . . . ]). FIG. 18 is a diagram illustrating the computation of a normalized TF-IDF weight in accordance with an example embodiment.

(4) Pairwise Similarity

Figure 19:
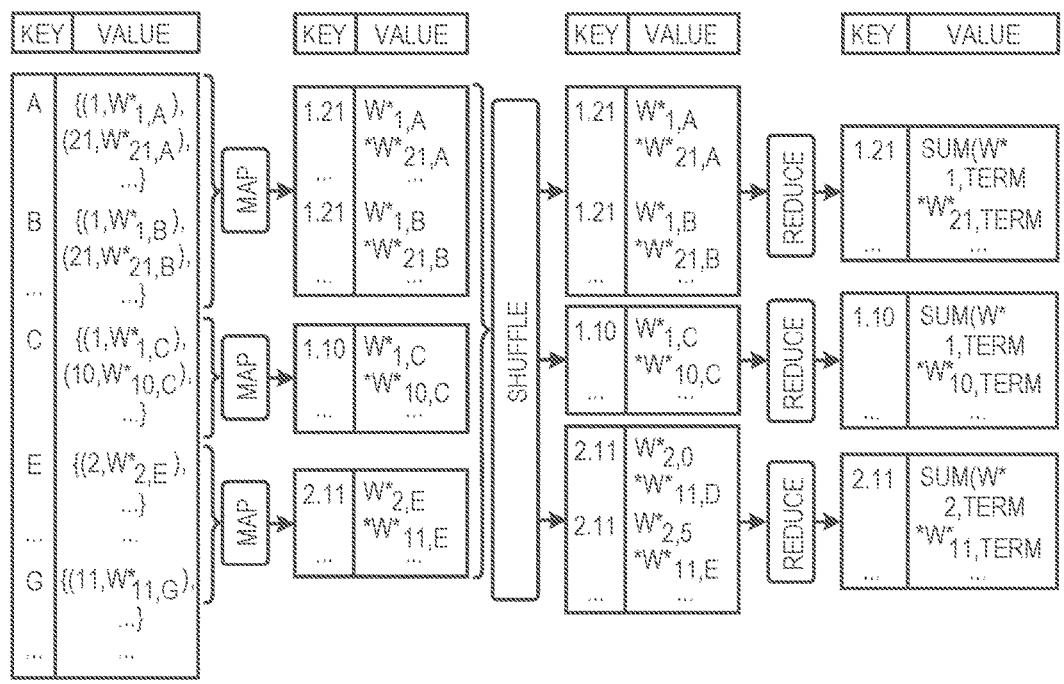
FIG. 19 is a diagram illustrating the calculation of partial similarity scores in accordance with an example embodiment.

The mapper pairs up all the documents which share the same term and calculates a partial similarity score contributed by the term. The reducer aggregates partial scores for document pairs. Only those pairs with a similarity score above a predefined threshold will be populated. FIG. 19 is a diagram illustrating the calculation of partial similarity scores in accordance with an example embodiment.

Fuzzy join shows the similarity of records at the attribute level and. provides pairs of records with connections based on name, address, phone, or URL. However, it does not reveal the distance between two records. Accuracy is also sacrificed for efficiency when deriving the cosine similarity scores using the above algorithm. For example, TF-IDF based cosine similarity is only computed on four attributes. Therefore, there is a need to further describe the distance between the discovered record pairs. In this stage, the technical problem is how to measure the similarity of two records.

In an example embodiment, an edge refinement module solves this problem as a binary classification problem: given a pair of records and their associated features, it predicts whether they are similar enough to represent the same business entity. Because fuzzy join has significantly reduced the number of pairs of records to be considered at this stage, more features can be compared between each pair of records for prediction without affecting performance.

Any number of features can be collected for every pair of records. These may include, for example, name, street address, city, postal code, country, phone, URL, URL, host, URL domains, industries, etc. A set of positive and negative training samples can be prepared to build the training model. Positive samples are the pairs believed to represent the same business entity. Negative samples are the pairs believed to represent different business entities.

The edge refinement step takes two inputs: (1) the pairs of records with connections identified in the fuzzy join step; (2) the original records. It outputs the structure of the entire graph. The edge refinement process is split into two phases:

(1) GraphMapper/GraniteMapper/PartialSndLeftJoinReducer/GraphExtensionMapper

The GraphMapper and GraniteMapper read the pairs of IDs of connected records and the full record profiles respectively. The PartialSndLeftJoinReducer and GraphExtensionMapper assemble the pairs of record IDs with the full organization profiles.

(2) PartialSndRightJoinReducer

This reducer computes a comprehensive set of similarity features between each pair of records and applies an offline classifier to calculate probability scores for each pair of records. Pairs with similarity lower than a predefined threshold are primed in this stage.

The output of the edge refinement step is, for example, as follows:

1. Record similarity double
2. source1 string
3. source_record_id1 string
4. source2 string
5. source_record_id2 string After fuzzy join and edge refinement, a graph is generated. Each record is taken as a node and two nodes are considered connected if their record-level similarity is above a graph similarity threshold. A MapReduce agglomerative clustering algorithm can then be applied to merge similar records into the same cluster (i.e., these records represent the same business entity). The algorithm is also similar to finding strongly connected components from a graph. In this greedy agglomerative clustering algorithm, each record is initialized to be a cluster of size one, and the process repeatedly discovers connected components by broadcasting local cluster centers. The local cluster center is represented by the node with maximum degree among its local graph.

Intuitively obvious duplicates will be merged into the same cluster in the early stage due to their strong connections. As the algorithm iterates, some good clusters may be incorrectly merged via some ambiguous nodes. To prevent such errors being further propagated, the algorithm may be stopped at an early stage.

The main idea of the base clustering algorithm is as follows. For every vertex $v_i$ in the graph, we maintain a component ID $c_i^h$ which is the minimum node ID within h hops from $v_i$. Initially, $c_i^h$ of $v_i$ is set to its own node id; that is, $c_i^0 = i$. For each iteration, each vertex sends its current $c_i^h$ to its neighbors. Then, $c_i^{h+1}$, the component ID of $v_i$ at the next step, is set to the minimum value among its current component ID and the received component IDs from its neighbors. Such an algorithm can be generalized as the following MapReduce algorithm:

```
1:  Input: A graph G = (V,E),
        hashing function h
        merging function m, and
        export function EXPORT
2:  Output: A set of connected components C ⊂ 2^V
3:  Either Initialize C_v = {v} Or C_v = {v} ∪ nbrs(v)
        depending on the algorithm.
4:  repeat
5:      mapper for node v:
6:      Compute h(C_v), which is a collection of key-value pairs
            (u, C_u) for u ∈ C_v.
7:      Emit all (u, C_u) ∈ h(C_v).
8:      reducer for node v:
9:      Let {C_v^(1), . . . , C_v^(K)} denote the set of values received
            from different mappers,
10:     Set C_u ← m ({C_v^(1), . . . , C_v^(K)})
11: until C_u does not change for all v
12: Return C = EXPORT(∪_v{C_v})
```

In this algorithm, each vertex v is associated with a label $v_{min}$ (i.e., $C_v$ is a singleton set $\{v_{min}\}$) which corresponds to the smallest ID amongst vertices that v knows are in its connected component. Initially, $v_{min} = v$ and so $C_v = \{v\}$. It then uses a Hash-Min hashing function to propagate its label $v_{min}$ in $C_v$ to all neighbors $u \in$ nbrs(v) in every round. On receiving the messages, the merging function m compiles the smallest vertex $v_{min}^{new}$ amongst the incoming messages and sets $C_v=\{v_{min}^{new}\}$. Thus a vertex adopts the minimum label found in its neighborhood as its own label. On convergence, vertices that have the same label are in the same connected component. Finally, the connected components are computed by the following EXPORT function, return sets of vertices grouped by their label.

In an example embodiment, several modifications to the base algorithm can be made:

(1) Instead of discovering the full connected, component as the final cluster, the algorithm may stop earlier. Some really ambiguous records (similar to different entitles) tend to connect different clusters together to form a giant cluster. Based on experimentation, it was discovered that good clusters usually get formed in the first few iterations. Stopping earlier will prevent errors from being propagated.

(2) Instead of using the vertex with the smallest ID as the cluster (component) center, the merging function m is updated to find the vertex with the largest degree among the incoming messages and it is placed as the local cluster center.

(3) Secondary sort is used to efficiently join intermediate clustering results with the graph.

(4) Instead of using the original long "source_record_id" (32-bytes hash) and "source_code" as the vertex identifier, a sequential unique number starting from 1 to each vertex may be assigned. This will dramatically reduce the size of data to shuffle.

The clustering step takes two inputs: (1) graph information which presents the similarity between each pair of records; (2) the cluster label assigned to each record in the previous clustering iteration. At the initial iteration, every record is assigned a unique cluster label. The clustering process is launched and can be split into the following 4 steps, with steps (2) and (3) being repeated for multiple iterations for the best cluster quality.

(1) GraphInitializationMapper/Reducer

Here the functionality is to identify all vertices in the graph and initialize a unique cluster label for every vertex.

The mapper reads the output of edge refinement and identifies all the vertices (organization records). The reducer assigns a unique label to every record and also find the degree of each vertex.

(2) GraphMapper/ComponentMapper/GraphCompoundJoinSSortReducer

Here the functionality is to initialize the adjacency list of the graph. For each vertex in the graph, its cluster labels assigned in the initialization or the previous iteration are identified as well as its neighbors.

GraphMapper reads the output of edge refinement and identifies all the edge information (i.e., the connected pairs of records). ComponentMapper takes the output of step (1) or step (3) and collects all the vertices as well as their cluster labels. GraphComponentJoinSSortReducer builds up the adjacency list for every vertex in the graph, i.e., for each vertex, the reducer emits its cluster label, its neighbors, and the iteration at which its cluster label was updated.

(3) JointComponentUpdateMapper/Reducer

Here, the functionality is that every vertex broadcasts the local cluster center and the cluster label is reassigned if the center of a bigger cluster is found in its neighbors.

The mapper goes through every vertex and finds all of its neighbors as well as their cluster labels. The reducer reassigns the cluster label for each vertex if it finds its neighbor is the center of a bigger cluster.

(4) ComponentSummaryMapper/Reducer

Here, the functionality is to write out the vertices with their final cluster labels.

Turning now to cluster quality evaluation, this module calculates the silhouette index for each record (cluster member) and cluster. Silhouette refers to a method of interpretation and validation of consistency within clusters that provides a succinct graphical representation of how well each object lies within its cluster. For each datum i, let a(i) be the average dissimilarity of i with all other data within the same cluster, a(i) can be interpreted as how well i is assigned to its cluster (the smaller the value, the better the assignment). The average dissimilarity of point i to a cluster c can be defined as the average of the distance from i to points in c.

Let b(i) be the lowest average dissimilarity of i to any other cluster of which i is not a member. The cluster with this lowest average dissimilarity is said to be the "neighboring cluster" of i because it is the next best-fit cluster for point i. A silhouette is then defined as such:

$$s(i) = \frac{b(i) - a(i)}{\max\{a(i), b(i)\}}$$

This can be written as $$s(i) = \begin{cases} 1 - a(i)/b(i), & \text{if } a(i) < b(i) \\ 0, & \text{if } a(i) = b(i) \\ b(i)/a(i) - 1, & \text{if } a(i) > b(i) \end{cases}$$

From the above definition it is clear that $-1 \leq s(i) \leq 1$

For S(i) to be close to 1, $a(i) \ll b(i)$. As a(i) is a measure of how dissimilar i is to its own cluster, a small value means it is well matched. Furthermore, a large b(i) implies that i is badly matched to its neighboring cluster. Thus, an S(i) close to 1 means that the datum is appropriately clustered. If S(i) is close to −1, then by the same logic it can be seen that/would be more appropriate if it was clustered in its neighboring cluster. An S(i) near 0 means that the datum is on the border of two natural clusters.

The average S(i) over all data of a cluster is a measure of how tightly grouped all the data in the cluster are. Thus, the average S(i) over all data of the entire dataset is a measure of how appropriately the data has been clustered. If there are too many or too few clusters, some of the clusters will typically display much narrower silhouettes than the rest. Thus, silhouette plots and averages may be used to determine the natural number of clusters within a dataset. One can also increase the likelihood of the silhouette being maximized at the correct number of clusters by re-scaling the data using feature weights that are cluster-specific.

Thus, the cluster-level index helps assess the quality of each cluster. Clusters with low confidence may not be populated as golden records. The cluster-level index can also be used to help prioritize other verification tasks.

After record linkage, each cluster may have multiple members (i.e., different records from various sources representing the same business entity). Because the sources provide information about an organization with various levels of completeness, truthfulness, and accessibility of presentation, it is common to find conflicts among members within a cluster. Data fusion alms at resolving conflicts and finding the true value of each attribute. In this step, the clusters and their members are taken as the input, and the most representative attribute values are selected to form a golden record.

In an example embodiment, a first step of data fusion involves joining a cluster with source records. For scalability, the result of clustering only produces identifications of records. In this step, the cluster members are supplemented with foil organization records.

The ClusterMapper reads clusters with IDs of records in each cluster. The SourceRecordMapper reads full source records. The ClusterJoinReducer joins the clusters with the full source records on record IDs.

One way to perform fusion is to use the majority vote: consider each source as a voter, and a value of an attribute wins one vote from a source if the source provides this value as the correct value for the attribute. The value that wins the most votes will be selected as the representative value for the attribute. However, there are two potential problems in the majority vote approach: (1) the vote of a source with low accuracy is treated equally to the vote of a source with high accuracy; and (2) values may not be exactly the same as other similar values, and even the true value can have a lower vote count than false ones.

In an example embodiment, a more sophisticated fusion model is utilized that takes more factors into consideration, including:

(1) reputation/accuracy of data sources;
(2) data independence among sources;
(3) similarity of each value to other values; and
(4) number of values provided by a single source.

The fission works in an iterative way: starting with an a priori value for the value's vote count and the source's reputation, these two values are refined iteratively until convergence. This may be thought of as a ranking problem. To solve this ranking problem, a common voting strategy is applied: votes from providers tor each value of the same data item are accumulated and the value with the highest vote count is chosen as the true one.

The vote count of a source is often a function of the reputation of the source. Since source reputation is typically unknown a priori, they proceed in an iterative fashion: the value vote count and source reputation are computed in each round until the results converge. Besides value frequency, number of supporters, and reputation of supporting data sources, advanced fusion algorithms also consider similarity among candidate values, their formats, and even inferred copying relationships among sources.

There are several fusion algorithms implemented in this data fusion module. Their brief introductions and mathematical details are summarized in the following table:

| Algorithm Name | Overview | MathDetail |
|---|---|---|
| HUB | Inspired by measuring web page authority based on analysis of web links Vote (C(v)): the sum of reputation of its providers Reputation (T(s)): the sum of the votes of its provided values | $C^0(v) = 0.5$ <br><br> $T^k(s) = \sum_{v \in V_s} C^{k-1}(v)$ <br><br> $T^k(s) = T^k(s)/\max_{s' \in S} T^k(s')$ <br><br> $C^k(v) = \sum_{s \in S_v} T^k(s)$ <br><br> $C^k(v) = C^k(v)/\max_{v' \in V_d} C^k(v')$ |
| AvgLog | Similar to HUB Reduce the effect of the number of provided values Weighted sum Log transformation | $C^0(v) = \frac{|S_v|}{|S_d|}$ <br><br> $T^k(s) = \sum_{v \in V_S} C^{k-1}(v) * \frac{\log|V_S|}{|V_S|}$ <br><br> $T^k(s) = T^k(s)/\max_{s' \in S} T^k(s')$ <br><br> $C^k(v) = \sum_{s \in S_v} T^k(s)$ <br><br> $C^k(v) = C^k(v)/\max_{v' \in V_d} C^k(v')$ |

-continued

| Algorithm Name | Overview | MathDetail |
| --- | --- | --- |
| INVEST | A source "invests" its reputation uniformly among its provided values. The vote of a value grows non-linearly with respect to the sum of invested reputation from its providers T(s): accumulating the vote of each provided value v, weighted by s's contribution among all contributors to v | $C^0(v) = \frac{|S_v|}{|S_d|}$ <br><br> $T^k(s) = \sum_{v \in V_S} C^{k-1}(v)$ <br><br> $* \frac{T^{k-1}(s)|}{|V_s| * \sum_{s' \in S_v} (T^{k-1}(s')/|V_{s'}|)}$ <br><br> $T^k(s) = T^k(s)/\max_{s' \in S} T^k(s')$ <br><br> $C^k(v) = \left( \sum_{s \in S_v} \frac{T^{k-1}(s)}{|V_s|} \right)^g \quad g = (1.2)$ <br><br> $C^k(v) = C^k(v)/\max_{v' \in V_d} C^k(v')$ |
| POOLEDINVEST | Similar to INVEST Linearly scaled vote count of each value on each attribute | $C^0(v) = \frac{1}{|V_d|}$ <br><br> $T^k(s) = \sum_{v \in V_S} C^{k-1}(v)$ <br><br> $* \frac{T^{k-1}(s)|}{|V_s| * \sum_{s' \in S_v} (T^{k-1}(s')/|V_{s'}|)}$ <br><br> $H^k(v) = \sum_{s \in S_v} \frac{T^k(s)}{|V_s|}$ <br><br> $C^k(v) = H^k(v) * \frac{H^k(v)^g}{\sum_{v' \in V_d} H^k(v')^g}$ |
| COSINE | Compute reputation of a source as the cosine similarity between the vector of its provided values and the vector of the probabilistically selected values | $g = (1.4)$ <br> $C^0(v) = 1$ <br> $T^k(s) = 0.8T^{k-1}(s)$ <br><br> $+ 0.2 \frac{\sum_{v \in V_S} C^{k-1}(v) \sum_{d \in D_S, v \in V_d/v_S} C^{k-1}(v)}{\sqrt{\sum_{d \in D_S} |V_d| * \sum_{d \in D_S, v \in V_d} C^{k-1}(v)^2}}$ <br><br> $C^k(v) = \frac{\sum_{s \in S_v} T^k(s)^3 - \sum_{s \in S_d/S_v} T^k(s)^3}{\sum_{s \in S_d} T^k(s)^3}$ |
| TruthFinder | Applies Bayesian analysis and computes the probability of a value being true conditioned on the observed providers Considers similarity between values and enhances the vote count of a value | $T^0(s) = 0.8$ <br><br> $C^k(v) = \sum_{s \in S_v} -\ln(1 - T^{k-1}(s))$ <br><br> $T^k(s) = \text{avg}_{v \in V_s}(1 - e^{-0.3 C^k(v)})$ <br><br> $\hat{C}^k(v) = \sum_{v' \in V_d} C^k(v')\text{sim}(v, v')$ |

-continued

| Algorithm Name | Overview | MathDetail |
| --- | --- | --- |
| AccuPr | Similar to TruthFinder Assumes different (dissimilar) values provided on the same data item are disjoint. Normalizes their probabilities | $T^0(s) = 0.8$<br><br>$C^k(v) = \sum_{s \in S_v} \ln \frac{N * T^{k-1}(s)}{1 - T^{k-1}(s)}$<br><br>$T^k(s) = \text{avg}_{v \in V_s} \frac{e^{C^k(v)}}{e^{C^k(v)} + (N + 1 - |V_d|)}$ |
| AccuSim | Augment AccuPr by considering value similarity (same as TruthFinder) | $T^0(s) = 0.8$<br><br>$C^k(v) = \sum_{s \in S_v} \ln \frac{N * T^{k-1}(s)}{1 - T^{k-1}(s)}$<br><br>$T^k(s) = \text{avg}_{v \in V_s} \frac{e^{C^k(v)}}{e^{C^k(v)} + (N + 1 - |V_d|)}$<br><br>$\hat{C}^k(v) = \sum_{v' \in V_d} C^k(v') \text{sim}(v, v')$ |

FusionClusterMemberMapper reads the join results from the last step. FusionClusterQualityMapper reads the s-index score of each cluster. FusionReducer applies fusion models to each cluster to compute vote counts and source reputations iteratively until convergence, generating a golden record with the selected representative value on each attribute. In addition, it includes the s-index score as a confidence score in even golden record. This confidence score may be utilized for other purposes, such as recommendation.

Figure 20:
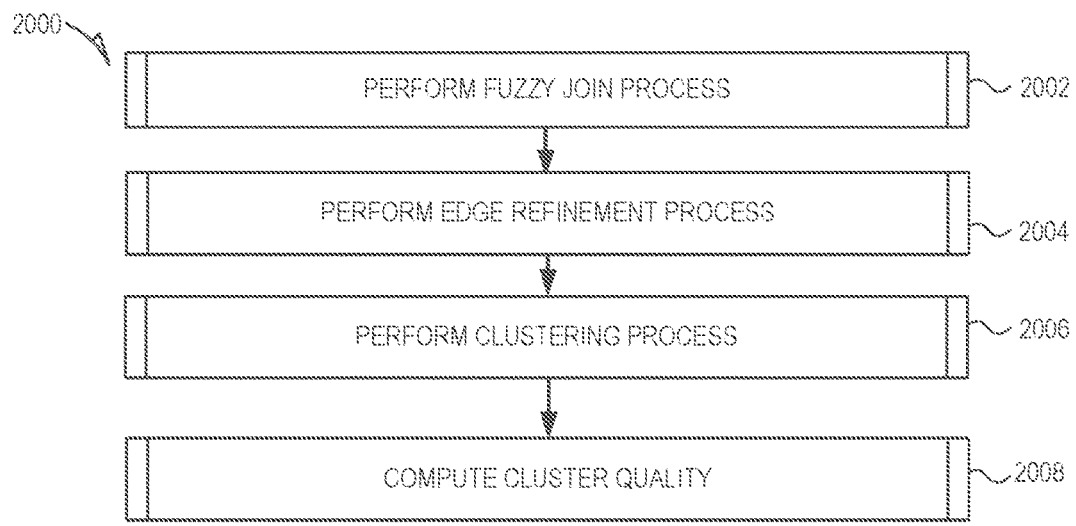
FIG. 20 is a flow diagram illustrating a method for orchestration of organization records in accordance with an example embodiment.
Figure 21:
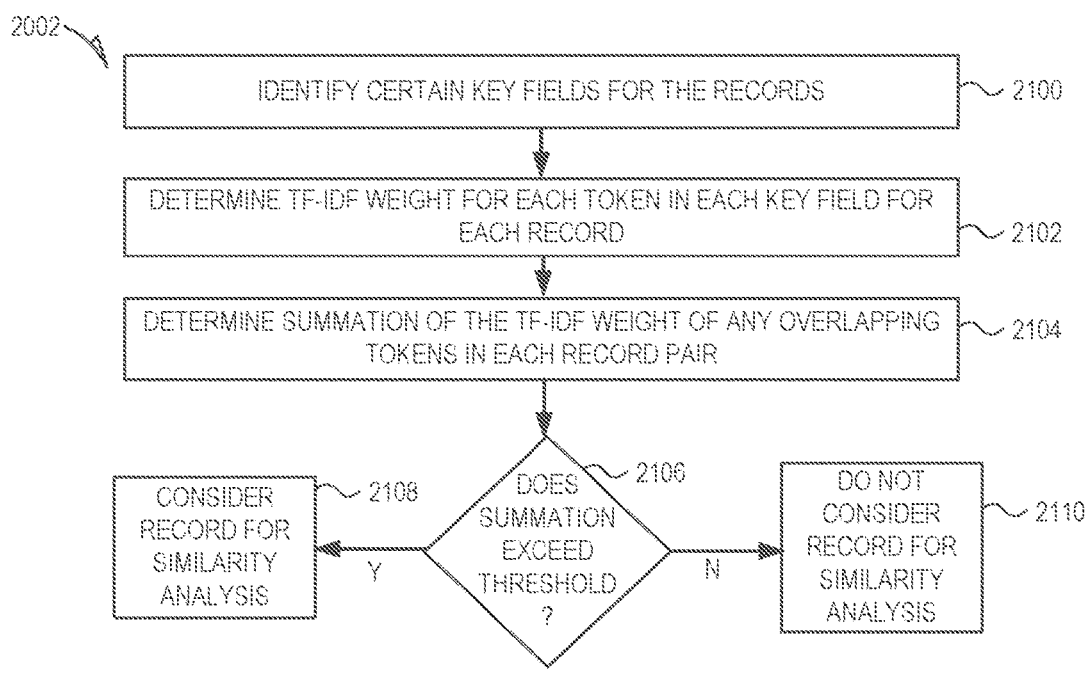
FIG. 21 is a flow diagram illustrating a fuzzy join process in detail in accordance with an example embodiment.

FIG. 20 is a flow diagram illustrating a method 2000 for orchestration of organization records in accordance with an example embodiment. At operation 2002, a fuzzy join process is performed. FIG. 21 is a flow diagram illustrating the fuzzy join operation 2002 in more detail in accordance with an example embodiment. Here, at operation 2100, certain key fields for the records are identified. These key fields represent fields that are most important to a determination that two records are similar enough to each other to be considered duplicates. For organization records, in an example embodiment, these key fields may include organization name, organization URL, organization address, and organization phone number. At operation 2102, for each record, the term frequency-inverse document frequency (TF-IDF) weight for each token in each of the key fields may be determined. A token may represent some portion of a field value, based on a definition defined in a parser. For example, for the organization name key field, any words that are separated by spaces or punctuation may be considered distinct tokens. Thus, the value "LinkedIn, Inc." in an organization name field would have two tokens, one being "LinkedIn" and the other being "Inc." The address field may be parsed similarly, perhaps with distinctions made between letters and numbers to signify different portions of a street address. Some fields, such as phone number, may have only one token.

At operation 2104, for every record pair, the summation of the TF-IDF weights of any overlapping tokens in the record pair is determined. At operation 2106, it is determined if this summation exceeds a threshold. If so, then the record pair is considered for similarity analysis at operation 2108. If not, however, then this record is not considered for similarity analysis at operation 2110. This process may also be known as canopy blocking.

The net effect is that only a portion of the possible record pairs are used for similarity analysis, specifically the record pairs having the highest likelihood of actually being duplicates. This results in significantly fewer processing cycles needed to perform the similarity analysis, as there are significantly fewer input record pairs to analyze.

Figure 22:
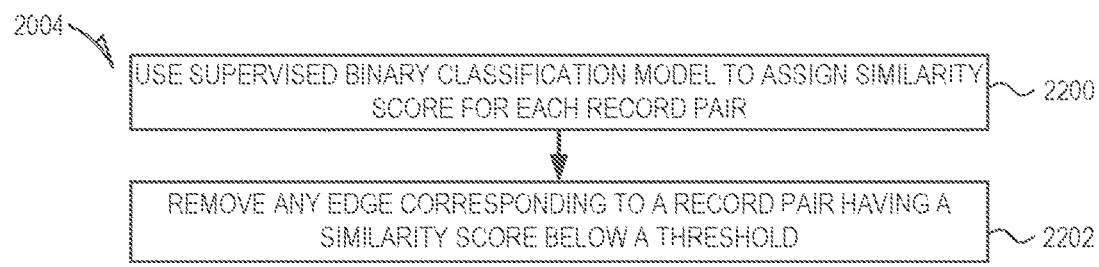
FIG. 22 is a flow diagram illustrating an edge refinement process in detail in accordance with an example embodiment.
Figure 23:
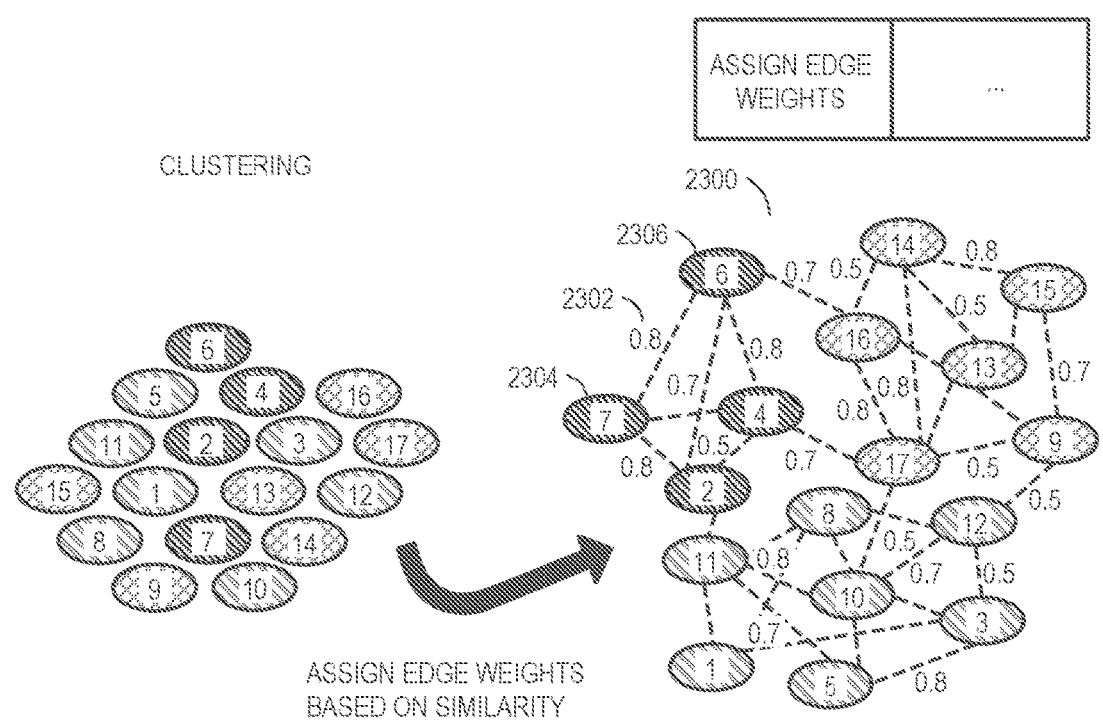
FIG. 23 is a diagram illustrating an example of a graph composed of nodes with edge weights assigned based on similarity.

Referring back to FIG. 20, once the fuzzy join operation 2002 is complete, at operation 2004 an edge refinement process is performed. FIG. 22 is a flow diagram illustrating the edge refinement operation 2004 in more detail in accordance with an example embodiment. At operation 2200, a supervised binary classification model is used to assign a similarity score for each record pair. The similarity score indicates how similar the records are based on a predetermined set of similarity features. These similarity features may include specific similarity of particular fields (e.g., name, industry, URL, address, etc.), as well as general similarity features such as Jaro-winkler, Jaccard, Levenstein and word/character based similarities. At operation 2202, any record pair having a similarity score below a threshold has its corresponding edge removed from the graph. The result is a graph with each node representing a record, and the similarity between examined record pairs represented as edges between nodes, with each edge assigned an edge score equal to fee underlying similarity score for the record pair. FIG. 23 is a example showing a graph 2300 composed of nodes with edge weights assigned based on similarity. For example, edge weight 2302 represents the similarity between node 2304 and node 2306.

Figure 24:
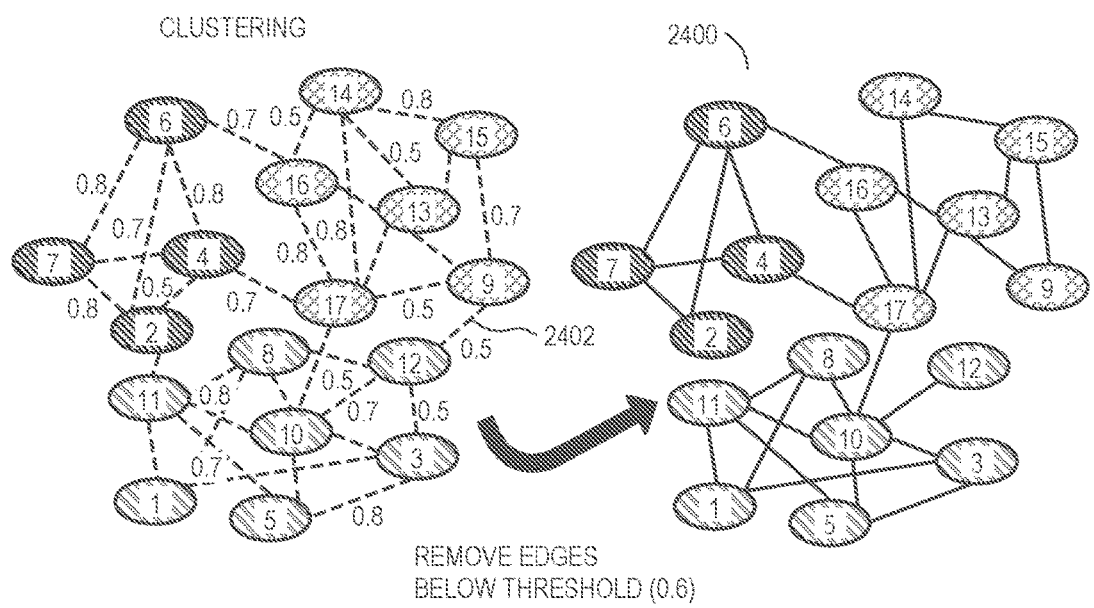
FIG. 24 is a diagram illustrating an example of a graph where edges below a particular threshold have been removed.

In an example embodiment, the ordering of some of these steps may be altered by combining the fuzzy join operation 2002 with the edge refinement operation 2004 such that a graph is constructed with edge weights first, and the fuzzy join process actually acts to remove edges whose weights are less than a predetermined threshold. FIG. 24 is an example showing a graph 2400 where edges below a particular threshold (0.6) have been removed. For example, edge 2402 is removed.

No matter how the graph is constructed, however, the result is a graph containing nodes with each node representing a record, and the similarity between examined record pairs represented as edges between nodes, with each edge assigned an edge score equal to the underlying similarity score for the record pair, and only for record pairs with a high likelihood of being duplicates.

Figure 25:
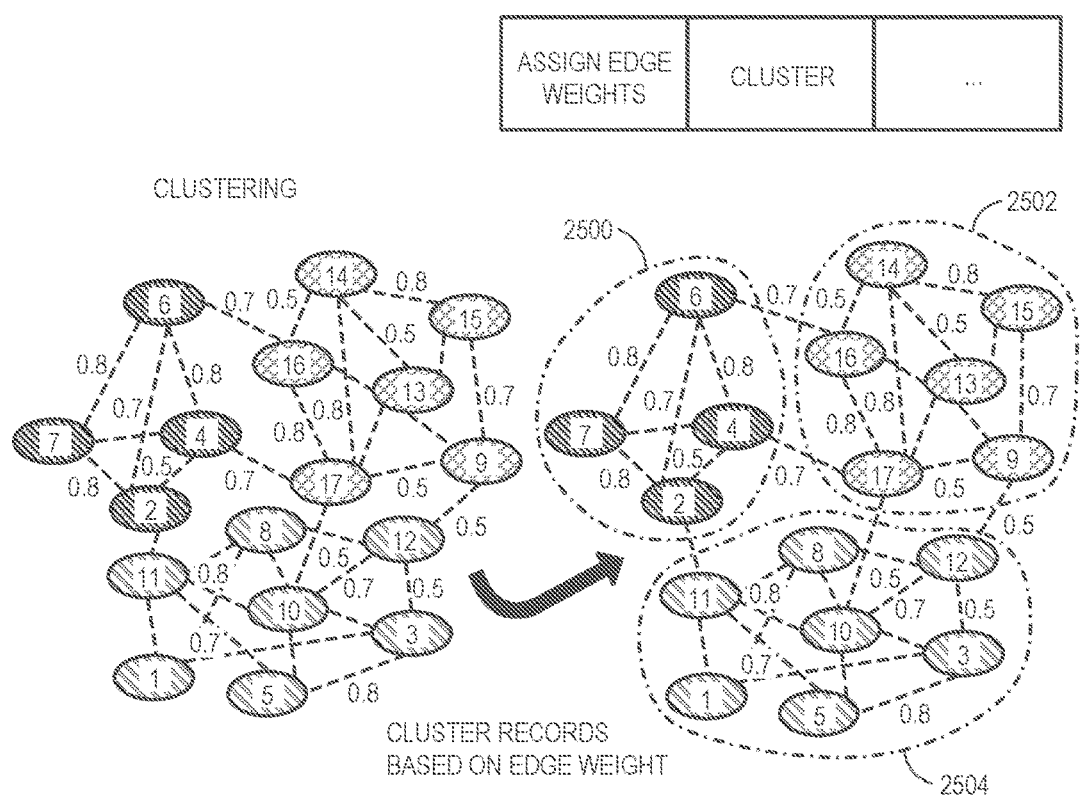
FIG. 25 is a diagram illustrating an example of the clustering process in accordance with an example embodiment.
Figure 26:
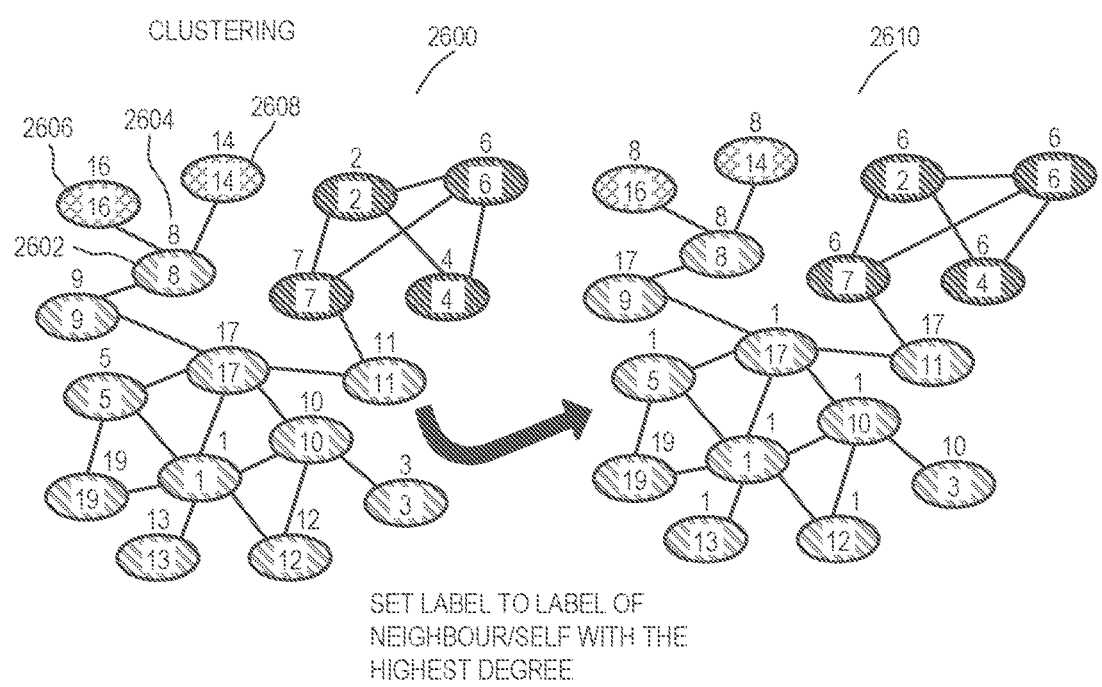
FIG. 26 is a diagram illustrating an example of setting labels as part of the clustering process in accordance with an example embodiment.

At operation 2006 of the method 2000, clustering of nodes in the graph occurs. FIG. 25 is a diagram illustrating an example of the clustering process in accordance with an example embodiment. Here, a set of clusters 2500, 2502, 2504 of nodes are derived, each cluster 2500, 2502, 2504 indicating nodes having a high likelihood of being duplicates of one another. In the clustering operation 2006, at the initial iteration, every record is assigned a unique cluster label. Then, at each iteration, the label for each record is set to the label of the neighbor cluster having the highest degree (degree being the number of connections from the cluster to outside the cluster) unless the record itself is already part of the cluster of neighbor clusters with the highest degree. FIG. 26 is a diagram illustrating an example of setting labels as part of the clustering operation 2006 in accordance with an example embodiment. As can be seen, each node has a label in graph 2600 (e.g., node 2602 has label 2604). Thus, for example, node 2602 has 3 connections while nodes 2606 and 2608 each have only 1 connection. Thus, the labels for nodes 2606 and 2608 are changed to the label for node 2602 in graph 2610.

Figure 27:
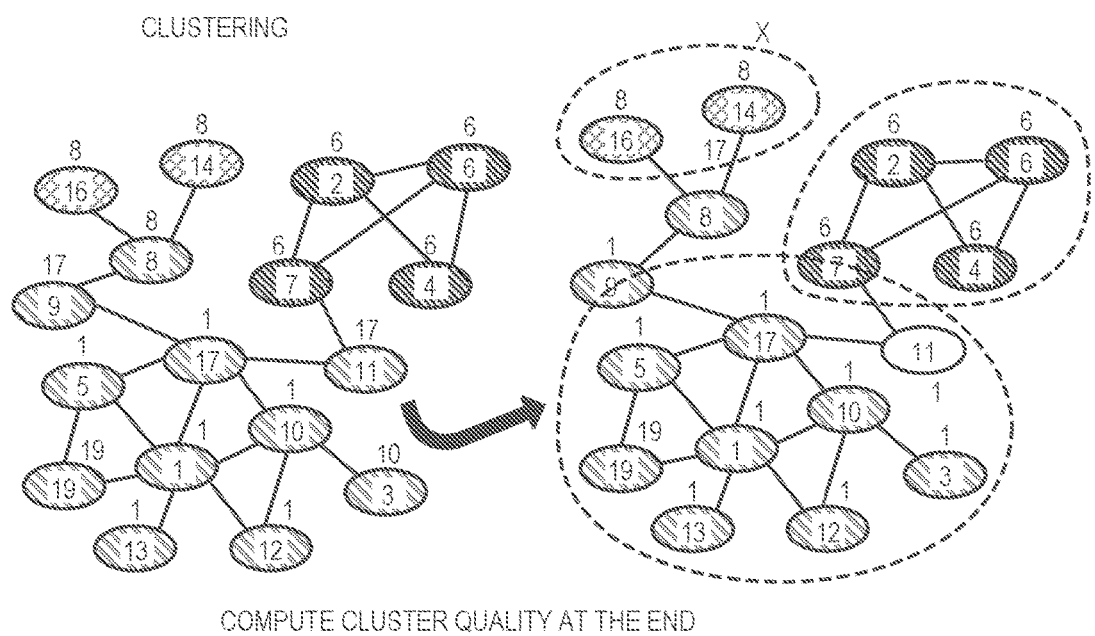
FIG. 27 is a diagram illustrating an example of computing cluster quality in accordance with an example embodiment.

At operation 2008 of the method 2000, cluster quality is computed. FIG. 27 is a diagram illustrating an example of computing cluster quality in accordance with an example embodiment. Cluster quality computation was described in detail earlier in this document. The result may be a cluster quality score for each cluster. What is done with this information may vary depending on the embodiment. In a first example embodiment, the cluster quality score for each cluster is compared with a cluster quality threshold, and if any cluster has a cluster quality score below the threshold, another iteration of the edge refinement operation 2004 and clustering operation 2006 is performed. In another example embodiment, the cluster quality scores for the clusters are averaged and if the average cluster quality is below a threshold, another iteration of the edge refinement operation 2004 and clustering operation 2006 is performed.

Using the Fused Records

The fused records (also know as golden records) can be utilized in a number of different ways. In a first example embodiment, the fused records can be used to automatically generate company pages (e.g., profiles) in a social networking service for any company that does not have such company pages in the social networking service. In another example embodiment, the fused records can be used by a sales tool to provide leads for contacts.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-27 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 28:
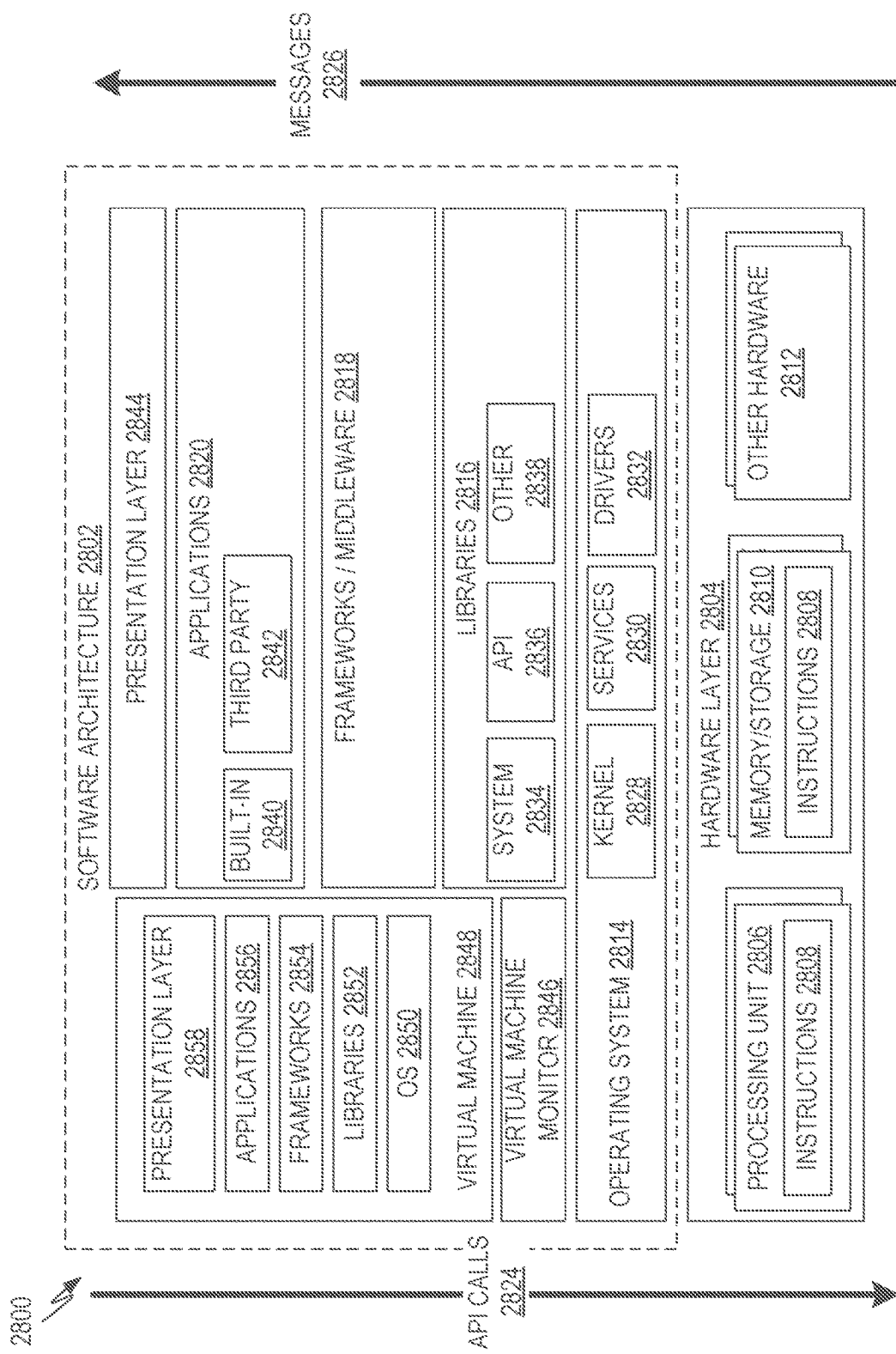
FIG. 28 is a block diagram illustrating a representative software architecture, which may be used in conjunction with various hardware architectures herein described.

FIG. 28 is a block diagram 2800 illustrating a representative software architecture 2802, which may be used in conjunction with various hardware architectures herein described. FIG. 28 is merely a non-limiting example of a software architecture, and it will be appreciated that many other architectures may be implemented to facilitate the functionality described herein. The software architecture 2802 may be executing on hardware such as a machine 2900 of FIG. 29 that includes, among other things, processors 2910, memory/storage 2930, and I/O components 2950. A representative hardware layer 2804 is illustrated and can represent, for example, the machine 2900 of FIG. 29. The representative hardware layer 2804 comprises one or more processing units 2806 having associated executable instructions 2808. The executable instructions 2808 represent the executable instructions of the software architecture 2802, including implementation of the methods, modules, and so forth of FIGS. 1-27. The hardware layer 2804 also includes memory and/or storage modules 2810, which also have the executable instructions 2808. The hardware layer 2804 may also comprise other hardware 2812, which represents any other hardware of the hardware layer 2804, such as the other hardware illustrated as part of the machine 2900.

In the example architecture of FIG. 28, the software architecture 2802 may be conceptualized as a stack of layers where each layer provides particular functionality. For example, the software architecture 2802 may include layers such as an operating system 2814, libraries 2816, frameworks/middleware 2818, applications 2820, and a presentation layer 2844. Operationally, the applications 2820 and/or other components within the layers may invoke application programming interface (API) calls 2824 through the software stack and receive responses, returned values, and so forth, illustrated as messages 2826, in response to the API calls 2824. The layers illustrated are representative in nature and not all software architectures have all layers. For example, some mobile or special purpose operating systems may not provide a layer of frameworks/middleware 2818, while others may provide such a layer. Other software architectures may include additional or different layers.

The operating system 2814 may manage hardware resources and provide common services. The operating system 2814 may include, for example, a kernel 2828, services 2830, and drivers 2832. The kernel 2828 may act as an abstraction layer between the hardware and the other software layers. For example, the kernel 2828 may be responsible for memory management, processor management (e.g., scheduling), component management, networking, security settings, arid so on. The services 2830 may provide other common services for the other software layers. The drivers 2832 may be responsible for controlling or interfacing with the underlying hardware. For instance, the drivers 2832 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2816 may provide a common infrastructure that may be utilized by the applications 2820 and/or other components and/or layers. The libraries 2816 typically provide functionality that allows other software modules to perform tasks in an easier fashion than by interfacing directly with the underlying operating system 2814 functionality (e.g., kernel 2828, services 2830, and/or drivers 2832). The libraries 2816 may include system 2834 libraries (e.g., C standard library) that may provide functions such as memory allocation functions, string manipulation functions, mathernatic functions, and the like. In addition, the libraries 2816 may include API 2836 libraries such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 2816 may also include a wide variety of other libraries 2838 to provide many other APIs to the applications 2820 and other software components/modules.

The frameworks 2818 (also sometimes referred to as middleware) may provide a higher-level common infrastructure that may be utilized by the applications 2820 and/or other software components/modules. For example, the frameworks 2818 may provide various graphic user interface (GUI) functions, high-level resource management, high-level location services, and so forth. The frameworks 2818 may provide a broad spectrum of other APIs that may be utilized by the applications 2820 and/or other software components/modules, some of which may be specific to a particular operating system or platform.

The applications 2820 include built-in applications 2840 and/or third party applications 2842. Examples of representative built-in applications 2840 may include, but are not limited to, a contacts application, a browser application, a book reader application, a location application, a media application, a messaging application, and/or a game application. The third party applications 2842 may include any of the built-in applications as well as a broad assortment of other applications. In a specific example, the third party application 2842 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 2842 may invoke the API calls 2824 provided by the mobile operating system such as the operating system 2814 to facilitate functionality described herein.

applications 2820 may utilize built-in operating system 2814 functions (e.g., kernel 2828, services 2830, and/or drivers 2832), libraries 2816 (e.g., system 2834, APIs 2836, and other libraries 2838), and frameworks/middleware 2818 to create user interfaces to interact with users of the system. Alternatively, or additionally, in some systems, interactions with a user may occur through a presentation layer, such as the presentation layer 2844. In these systems, the application/module "logic" can be separated from the aspects of the application/module that interact with a user.

Some software architectures utilize virtual machines. In the example of FIG. 28, this is illustrated by a virtual machine 2848. A virtual machine creates a software environment where applications/modules can execute as if they were executing on a hardware machine (such as the machine 2900 of FIG. 29, for example). A virtual machine is hosted by a host operating system (e.g., operating system 2814 in FIG. 28) and typically, although not always, has a virtual machine monitor 2846, which manages the operation of the virtual machine as well as the interface with the host operating system (e.g., operating system 2814). A software architecture executes within the virtual machine 2848, such as an operating system 2850, libraries 2852, frameworks/middleware 2854, applications 2856, and/or a presentation layer 2858. These layers of software architecture executing within the virtual machine 2848 can be the same as corresponding layers previously described or may be different.

Example Machine Architecture and Machine-Readable Medium

Figure 29:
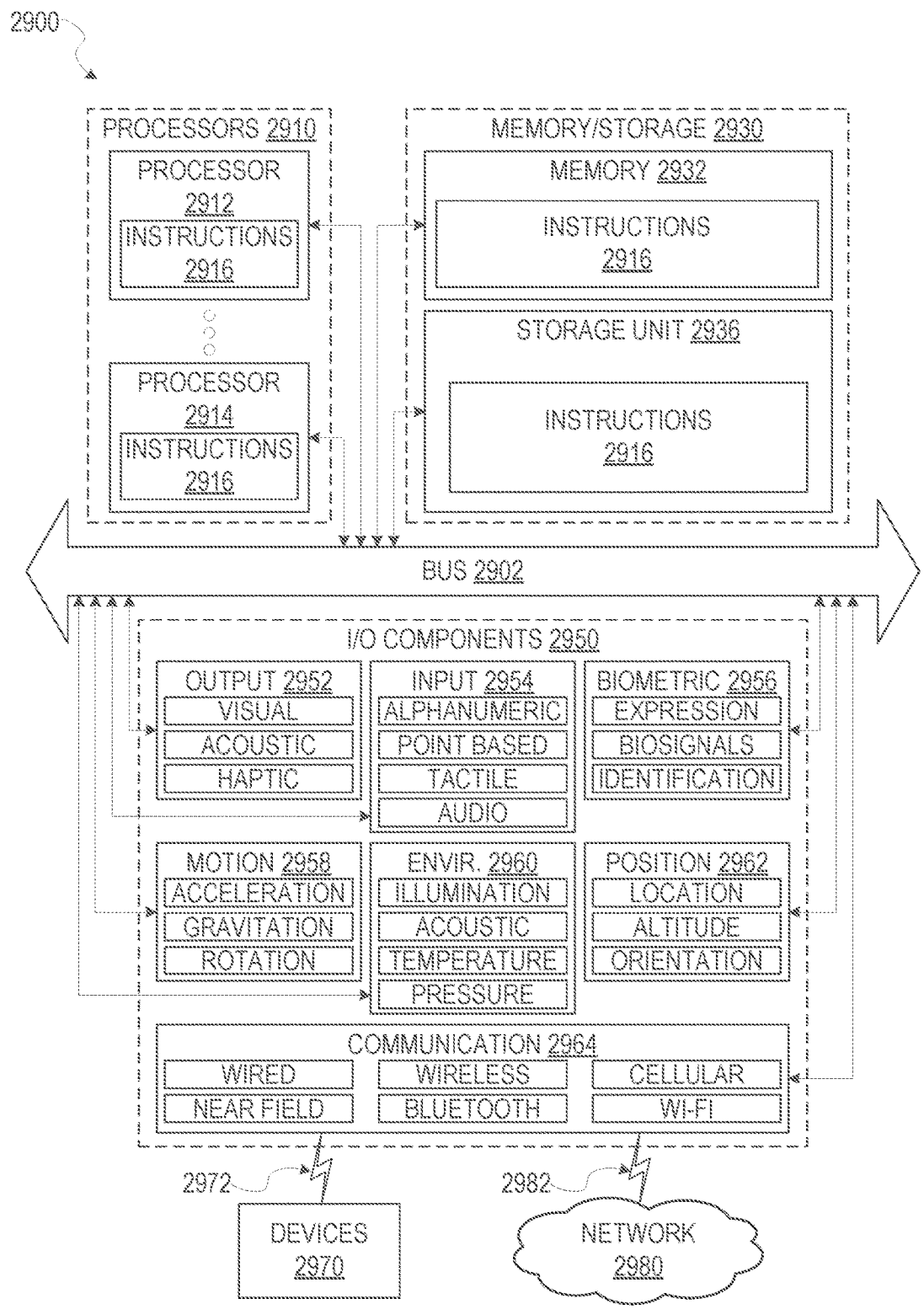
FIG. 29 is a block diagram illustrating components of a machine, according to some example embodiments, able to read instructions from a machine-readable medium (e.g., a machine-readable storage medium) and perform any one or more of the methodologies discussed herein.

FIG. 29 is a block diagram illustrating components of a machine 2900, according to some example embodiments, able to read instructions from a machine-readable medium (e.g., a machine-readable storage medium) and perform any one or more of the methodologies discussed herein. Specifically, FIG. 29 shows a diagrammatic representation of the machine 2900 in the example form of a computer system, within which instructions 2916 (e.g., software, a program, an application, an applet, an app, or other executable code) for causing the machine 2900 to perform any one or more of the methodologies discussed herein may be executed. The instructions transform the general, non-programmed machine into a particular machine programmed to carry out the described, and illustrated functions in the manner described. In alternative embodiments, the machine 2900 operates as a standalone device or may be coupled (e.g., networked) to other machines. In a networked deployment, the machine 2900 may operate in the capacity of a server machine or a client machine in a server-client network environment, or as a peer machine in a peer-to-peer (or distributed) network environment. The machine 2900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2916, sequentially or otherwise, that specify actions to be taken by the machine 2900. Further, while only a single machine 2900 is illustrated, the term "machine" shall also be taken to include a collection of machines 2900 that individually or jointly execute the instructions 2916 to perform any one or more of the methodologies discussed herein.

The machine 2900 may include processors 2910, memory/storage 2930, and I/O components 2950, which may be configured to communicate with each other such as via a bus 2902. In an example embodiment, the processors 2910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 2912 and a processor 2914 that may execute the instructions 2916. The term "processor" is intended to include multi-core processors that may comprise two or more independent processors (sometimes referred to as "cores") that may execute instructions contemporaneously. Although FIG. 29 shows multiple processors 2910, the machine 2900 may include a single processor with a single core, a single processor with multiple cores (e.g., a multi-core processor), multiple processors with a single core, multiple processors with multiples cores, or any combination thereof.

The memory/storage 2930 may include a memory 2932, such as a main memory, or other memory storage, and a storage unit 2936, both accessible to the processors 2910 such as via the bus 2902. The storage unit 2936 and memory 2932 store the instructions 2916 embodying any one or more of the methodologies or functions described herein. The instructions 2916 may also reside, completely or partially, within the memory 2932, within the storage unit 2936, within at least one of the processors 2910 (e.g., within the processor's cache memory), or any suitable combination thereof, during execution thereof by the machine 2900. Accordingly, the memory 2932, the storage unit 2936, and the memory of the processors 2910 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 2916. The term "machine-readable medium" shall also be taken to include any medium, or combination of multiple media, that is capable of storing instructions (e.g., instructions 2916) for execution by a machine (e.g., machine 2900), such that the instructions, when executed by one or more processors of the machine (e.g., processors 2910), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 2950 may include a wide variety of components to receive input, provide output, produce output, transmit information, exchange information, capture measurements, and so on. The specific I/O components 2950 that are included in a particular machine will depend on the type of machine. For example, portable machines such as mobile phones will likely include a touch input device or other such input mechanisms, while a headless server machine will likely not include such a touch input device. It will be appreciated that the I/O components 2950 may include many other components that are not shown in FIG. 29. The I/O components 2950 are grouped according to functionality merely for simplifying the following discussion and the grouping is in no way limiting. In various example embodiments, the I/O components 2950 may include output components 2952 and input components 2954. The output components 2952 may include visual components (e.g., a display such as a plasma display panel (PDF), a light emitting diode (LED) display, a liquid crystal display (LCD), a projector, or a cathode ray tube CRT)), acoustic components (e.g., speakers), haptic components (e.g., a vibratory motor, resistance mechanisms), other signal generators, and so forth. The input components 2954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 2950 may include biometric components 2956, motion components 2958, environmental components 2960, or position components 2962, among a wide array of other components. For example, the biometric components 2956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2958 may include acceleration sensor components (e.g., accelerometer), gravitation sensor components, rotation sensor components (e.g., gyroscope), and so forth. The environmental components 2960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 2962 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2950 may include communication components 2964 operable to couple the machine 2900 to a network 2980 or devices 2970 via a coupling 2982 and a coupling 2972 respectively. For example, the communication components 2964 may include a network interface component or other suitable device to interface with the network 2980. In further examples, the communication components 2964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2970 may be another machine or any of a wide variety of peripheral devices (e.g., a peripheral device coupled via a Universal Serial Bus (USB)).

Moreover, the communication components 2964 may detect identifiers or include components operable to detect identifiers. For example, the communication components 2964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2964, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 2980 may be an ad hoc network, an intranet, an extranet a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 2980 or a portion of the network 2980 may include a wireless or cellular network and the coupling 2982 may be a Code Division Multiple Access (CDMA) connection, a Global System for Mobile communications (GSM) connection, or another type of cellular or wireless coupling. In this example, the coupling 2982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 2916 may be transmitted or received over the network 2980 using a transmission medium via a network interface device (e.g., a network interface component included in the communication components 2964) and utilizing any one of a number of well-known transfer protocols (e.g., hypertext transfer protocol (HTTP)). Similarly, the instructions 2916 may be transmitted or received using a transmission medium via the coupling 2972 (e.g., a peer-to-peer coupling) to the devices 2970. The term "transmission medium" shall be taken to include any intangible medium that is capable of storing, encoding, or carrying the instructions 2916 for execution by the machine 2900, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method for enrichment of a logo field of a first record in a computer system, the method comprising:
    obtaining a web page using a web page address stored in the first record;
    parsing the web page to extract one or more images from the web page along with a first plurality of features for each of the one or more images from the web page, the first plurality of features including proximity of each of the one or more images from the web page to a top of the web page, without rendering the web page;
    inputting information about each image of the web page and the extracted first plurality of features for the web page into the supervised machine learning classifier to calculate a logo confidence score for each image of the web page, the logo confidence score indicating a probability that the image is an organization logo, the supervised machine learning classifier utilizing a random forest algorithm and a k-nearest neighbor classifier; and
    in response to a particular image in the web page having a logo confidence score transgressing a first threshold, injecting the particular image into an organization logo field of the first record.

2. The method of claim 1, wherein the first plurality of features includes image dimension.

3. The method of claim 1, wherein the first plurality of features includes whether an image links to a home page of an organization web site.

4. The method of claim 1, wherein the first plurality of features includes similarity of an organization name extracted from the first record to a file name of an image.

5. The method of claim 1, wherein the first plurality of features includes similarity of an organization name extracted from the first record to tag attributes surrounding a tag in the web page.

6. The method of claim 1, further comprising feeding a vector of common terms either positively or negatively correlated with a logo into the supervised machine learning classifier and using the presence of any of these terms in a tag in the web page to influence whether a nearby image corresponds to an organization logo.

7. The method of claim 1, wherein the web page is a home page of an organization web site.

8. A system comprising:
a computer-readable medium having instructions stored thereon, which, when executed by a processor, cause the system to perform operations comprising:
   obtaining a web page using a web page address stored in the first record;
   parsing the web page to extract one or more images from the web page along with a first plurality of features for each of the one or more images from the web page, the first plurality of features including proximity of each of the one or more images from the web page to a top of the web page, without rendering the web page;
   inputting information about each image of the web page and the extracted first plurality of features for the web page into the supervised machine learning classifier to calculate a logo confidence score for each image of the web page, the logo confidence score indicating a probability that the image is an organization logo, the supervised machine learning classifier utilizing a random forest algorithm and a k-nearest neighbor classifier; and
   in response to a particular image in the web page having a logo confidence score transgressing a first threshold, injecting the particular image into an organization logo field of the first record.

9. The system of claim 8, wherein the first plurality of features includes image dimension.

10. The system of claim 8, wherein the first plurality of features includes whether an image links to a home page of an organization web site.

11. The system of claim 8, wherein the first plurality of features includes similarity of an organization name extracted from the first record to a file name of an image.

12. The system of claim 8, wherein the first plurality of features includes similarity of an organization name extracted from the first record to tag attributes surrounding a tag in the web page.

13. The system of claim 8, wherein the operations further comprise feeding a vector of common terms either positively or negatively correlated with a log into the supervised machine learning classifier and using the presence of any of these terms in a tag in the web page to influence whether a nearby image corresponds to an organization logo.

14. The system of claim 8, wherein the web page is a home page of an organization web site.

15. A non-transitory machine-readable storage medium comprising instructions, which when implemented by one or more machines, cause the one or more machines to perform operations comprising:
   obtaining a web page using a web page address stored in the first record;
   parsing the web page to extract one or more images from the web page along with a first plurality of features for each of the one or more images from the web page, the first plurality of features including proximity of each of the one or more images from the web page to a top of the web page, without rendering the web page;
   inputting information about each image of the web page and the extracted first plurality of features for the web page into the supervised machine learning classifier to calculate a logo confidence score for each image of the web page, the logo confidence score indicating a probability, that the image is an organization logo, the supervised machine learning classifier utilizing a random forest algorithm and a k-nearest neighbor classifier; and
   in response to a particular image in the web page having a logo confidence score transgressing a first threshold, injecting the particular image into an organization logo field of the first record.

16. The non-transitory machine-readable storage medium of claim 15, wherein the first plurality of features includes image dimension.

17. The non-transitory machine-readable storage medium of claim 15, wherein the first plurality of features includes whether an image links to a home page of an organization web site.

18. The non-transitory machine-readable storage medium of claim 15, wherein the first plurality of features includes similarity of an organization name extracted from the first record to a file name of an image.

19. The non-transitory machine-readable storage medium of claim 15, wherein the first plurality of features includes similarity of an organization name extracted from the first record to tag attributes surrounding a tag in the web page.

20. The non-transitory machine-readable storage medium of claim 15, wherein the operations further comprise feeding a vector of common terms either positively or negatively correlated with a logo into the supervised machine learning classifier and using the presence of any of these terms in a tag in the web page to influence whether a nearby image corresponds to an organization logo.

* * * * *

UNITED STATES PATENT AND TRADEMARK OFFICE
CERTIFICATE OF CORRECTION

PATENT NO. : 10,282,606 B2
APPLICATION NO. : 15/937051
DATED : May 7, 2019
INVENTOR(S) : Guo et al.

It is certified that error appears in the above-identified patent and that said Letters Patent is hereby corrected as shown below:

On the Title Page

On page 2, in Column 2, item (56) under "Other Publications", Line 34, delete "ltemsets"," and insert --Itemsets",-- therefor In the Claims In Column 43, Line 42, in Claim 13, delete "log" and insert --logo-- therefor In Column 44, Lines 16-17, in Claim 15, delete "probability," and insert --probability-- therefor Signed and Sealed this
Twenty-first Day of April, 2020

Andrei Iancu
*Director of the United States Patent and Trademark Office*